(12) United States Patent
Yamamoto et al.

(10) Patent No.: US 9,358,512 B2
(45) Date of Patent: Jun. 7, 2016

(54) FLUID CONTROL DEVICE AND FLUID MIXER

(71) Applicant: FUJIKURA LTD., Koto-ku, Tokyo (JP)

(72) Inventors: Satoshi Yamamoto, Sakura (JP); Hiroyuki Wakioka, Sakura (JP); Osamu Nukaga, Sakura (JP); Tatsuya Shioiri, Sakura (JP)

(73) Assignee: FUJIKURA LTD., Tokyo (JP)

(*) Notice: Subject to any disclaimer, the term of this patent is extended or adjusted under 35 U.S.C. 154(b) by 154 days.

(21) Appl. No.: 14/261,095

(22) Filed: Apr. 24, 2014

(65) Prior Publication Data

US 2014/0233348 A1 Aug. 21, 2014

Related U.S. Application Data

(63) Continuation of application No. PCT/JP2013/060308, filed on Apr. 4, 2013.

(30) Foreign Application Priority Data

Apr. 6, 2012 (JP) ................. 2012-087669

(51) Int. Cl.
*B01F 5/06* (2006.01)
*B01F 13/00* (2006.01)
*B01J 19/00* (2006.01)
*B01F 15/00* (2006.01)

(52) U.S. Cl.
CPC ......... *B01F 13/0064* (2013.01); *B01F 13/0066* (2013.01); *B01F 15/00928* (2013.01); *B01J 19/00* (2013.01)

(58) Field of Classification Search
CPC .................................................. B01F 13/0064

USPC ............ 366/181.5, 181.6, 336, 337, 338, 340
See application file for complete search history.

(56) References Cited

U.S. PATENT DOCUMENTS 5,486,335 A 1/1996 Wilding et al.
5,803,600 A 9/1998 Schubert et al.
(Continued)

FOREIGN PATENT DOCUMENTS

DE 19748481 A1 5/1999
DE 19928123 A1 12/2000
(Continued)

OTHER PUBLICATIONS

Communication dated Oct. 21, 2014, issued by the Japan Patent Office in corresponding Japanese Application No. 2013-544932.
(Continued)

*Primary Examiner* — David Sorkin
(74) *Attorney, Agent, or Firm* — Sughrue Mion, PLLC

(57) ABSTRACT

A fluid control device for mixing liquids, includes at least: a monolithic base body; and a plurality of micro holes disposed in the base body. Also, the micro holes in a flow channel group α that configures a specific group have opening portions in a region A and a region B on surfaces being outer surfaces of the base body, the micro holes in a flow channel group β (n) that configures the other specific group have opening portions in the region A and a region C (n) on the surfaces being outer surfaces of the base body, and in the base body, the micro holes are disposed apart from the micro holes belonging to the different flow channel group throughout entire lengths. Here, the n refers to a natural number.

14 Claims, 20 Drawing Sheets

(56) References Cited

U.S. PATENT DOCUMENTS

| | | | |
|---|---|---|---|
| 6,082,891 A * | 7/2000 | Schubert | B01F 5/0256 366/338 |
| 6,321,998 B1 * | 11/2001 | Schubert | B01F 5/0256 239/430 |
| 6,802,640 B2 * | 10/2004 | Schubert | B01F 5/0644 366/181.6 |
| 2002/0057627 A1 | 5/2002 | Schubert et al. | |
| 2009/0031923 A1 | 2/2009 | Teshima et al. | |
| 2009/0296515 A1 | 12/2009 | Ezaki et al. | |
| 2009/0314416 A1 | 12/2009 | Ashmead et al. | |
| 2011/0151499 A1 | 6/2011 | Quake et al. | |

FOREIGN PATENT DOCUMENTS

| | | |
|---|---|---|
| DE | 20209009 U1 | 8/2002 |
| EP | 1674152 A2 | 6/2006 |
| GB | 2 073 604 A | 10/1981 |
| JP | 56-158134 A | 12/1981 |
| JP | 09-506034 A | 6/1997 |
| JP | 2002-292274 A | 10/2002 |
| JP | 2004-081924 A | 3/2004 |
| JP | 2007-069202 A | 3/2007 |
| JP | 2007-196218 A | 8/2007 |

OTHER PUBLICATIONS

Communication dated Apr. 23, 2015, issued by the European Patent Office in corresponding European Application No. 13772170.0.
Naohisa Yanagawa et al., "Development of a Micromixer", Savemation Review, 2005, pp. 60-63.
International Search Report of PCT/JP2013/060308 dated Jul. 9, 2013.
Office Action issued by Japanese Patent Office in Japanese Application No. 2013-544932 mailed Jul. 22, 2014.

* cited by examiner

X1-X1 CROSS-SECTION

Y1-Y1 CROSS-SECTION

ARROW Z1

X2-X2 CROSS-SECTION

Y2-Y2 CROSS-SECTION

X3-X3 CROSS-SECTION

Y3-Y3 CROSS-SECTION

X4-X4 CROSS-SECTION

Y4-Y4 CROSS-SECTION

ARROW Z4

X5-X5 CROSS-SECTION

Y5-Y5 CROSS-SECTION

X6-X6 CROSS-SECTION

Y6-Y6 CROSS-SECTION

X8-X8 CROSS-SECTION

FIRST REGION             SECOND REGION

ENCLOSED PLAN VIEW OF A PORTION

ENCLOSED CROSS-SECTIONAL VIEW OF A PORTION

FLUID CONTROL DEVICE AND FLUID MIXER

CROSS REFERENCE TO RELATED APPLICATIONS

This application is a continuation application based on a PCT Patent Application No. PCT/JP2013/060308, filed Apr. 4, 2013, whose priority is claimed on Japanese Patent Application No. 2012-087669, filed Apr. 6, 2012, the entire content of which are hereby incorporated by reference.

BACKGROUND OF THE INVENTION

1. Field of the Invention

The present invention relates to a fluid control device that mixes a fluid in a minute space and a fluid mixer.

The fluid control device and the fluid mixer are preferably used in, for example, micro total analysis systems (µTAS, also called "micro-TAS").

Here, µTAS refers to a biochemical analyzer that is provided with a minute flow channel, a reaction chamber or a mixing chamber on a chip by MEMS techniques and analyzes a variety of liquids or gases, such as blood or DNA using a chip or a device.

2. Description of the Related Art

A micro chemical process in which chemical processes such as mixing, reacting, extracting, separating, heating and cooling are carried out in a minute flow channel or a minute space is proposed, and studies have been made regarding micro mixers that enable highly efficient mixing in minute spaces.

A micro mixer is a device that carries out mixing in an extremely small space of several hundred micrometers or less, and, since it is possible to shorten the distance between matrixes being mixed, the mixing efficiency can be significantly improved.

As an example, a micro emulsifying device and an emulsifying method that can generate emulsion without using a surfactant are known (Japanese Unexamined Patent Application, First Publication No. 2004-81924).

In addition, a micro mixer in which a liquid made to flow in through a plurality of inflow openings is repeatedly divided and mixed in three-dimensional flow channels formed by combining plates provided with grooves using a precision machining, thereby producing a liquid mixture is known (Savemation Review (August 2005), pp. 60 to 63).

In order to enable the mixing of liquids that are not easily mixed or blended within a short period of time in the micro mixer, there is a method in which, for example, two layers of flow are divided into a number of flows on a plane so as to form a number of laminar flows, thereby improving the mixing and stirring efficiency.

However, in order to divide the flow into a lot of flows, it was necessary to form complicated multiple flow channels using precision machining techniques, which created a problem of an increase in the manufacturing costs.

In addition, even in a case in which the multiple flow channels were used, since a fluid was still a laminar flow in an extremely small flow channel that was two-dimensionally formed, and diffusion was a dominant factor in stirring and mixing, there was a possibility of improvement of the mixing efficiency.

In a case in which a three-dimensional flow channel was formed by stacking plates in which the multiple flow channels were formed in order to improve the mixing efficiency, there were problems in that the apparatus configuration became complicated, liquid leaked in the joining interface between the stacked plates, and pressure resistance could not be increased.

Furthermore, generated solid contents gradually accumulated at intersection portions of flow channels in the joining interface between the stacked plates and the like, and partially closed the flow channels, and therefore there was a concern that the mixing efficiency of liquids might significantly decrease.

The invention has been made in consideration of the above facts, and an object of the invention is to provide a fluid control device and a fluid mixer which can extremely efficiently mix fluids and have a high treatment capability and high pressure resistance.

SUMMARY

A fluid control device according to a first aspect of the invention is a fluid control device for mixing fluids, including at least a monolithic base body; and a plurality of micro holes disposed in the base body. Also, the micro holes in a flow channel group α that configures a specific group have opening portions in a region A and a region B on surfaces (outer surfaces) of the base body, the micro holes in a flow channel group β (n) that configures the other specific group have opening portions in the region A and a region C (n) on the surfaces (outer surfaces) of the base body, and, in the base body, the micro holes are disposed apart from the micro holes belonging to the different flow channel group (throughout entire lengths).

Here, the n refers to a natural number.

In the region A, the opening portions of all the micro holes may be two-dimensionally disposed.

The opening portions in the region A may be disposed in locations most adjacent to the opening portions of the micro holes belonging to the different flow channel group.

A fluid mixer according to a second aspect of the invention is made up of the fluid control device according to the first aspect of the invention; and a housing that accommodates the fluid control device and includes at least a monolithic outflow space facing the region A of the fluid control device and inflow spaces separately facing the region B and the region C of the fluid control device.

A fluid mixer according to a third aspect of the invention includes a plurality of micro holes that function as flow channels, a plurality of inflow spaces and a common outflow space in a monolithic base body, in which, among the micro holes, all the micro holes that configure one group have one opening portion communicated with specific one of the inflow spaces and an other opening portion communicated with the outflow space respectively, and all the micro holes that configure the other group have an opening portion communicated with the other specific inflow space and the other opening portion communicated with the outflow space respectively.

The other opening portions of the micro holes that configure the group and the other opening portions of all the micro holes that configure the other group may be two-dimensionally disposed in a plane facing the outflow space.

In the plane facing the outflow space, the other opening portions of the micro holes may be disposed at locations most adjacent to the other opening portions having the opening portion communicated with the different inflow space.

The plurality of the micro holes may have substantially the same length.

According to the aspects of the invention, it is possible to provide a fluid mixer and a fluid control device which enable extremely efficient mixing and have a high treatment capability and high pressure resistance.

BRIEF DESCRIPTION OF THE DRAWINGS

FIG. 2A is a schematic view illustrating a fluid control device 1a according to a modification example of the first embodiment, and a perspective view schematically illustrating the fluid control device 1a.

FIG. 10A is a schematic view illustrating a fluid mixer 10a according to a modification example of the second embodiment, and a schematic cross-sectional view of the fluid mixer 10a.

DETAILED DESCRIPTION OF THE PREFERRED EMBODIMENTS

Next, the present invention will be described in more detail using the following embodiments and the following specific examples with reference to the accompanying drawings, but the present invention is not limited to the embodiment and the examples.

In addition, in the following description with reference to the drawings, since the drawings are schematic, attention should be paid to a fact that the ratios and the like of the dimensions are different from those in the actual cases, and only necessary members for the description will be illustrated for easy understanding.

(1) the Configuration of a Fluid Control Device

First Embodiment

Figure 1A:
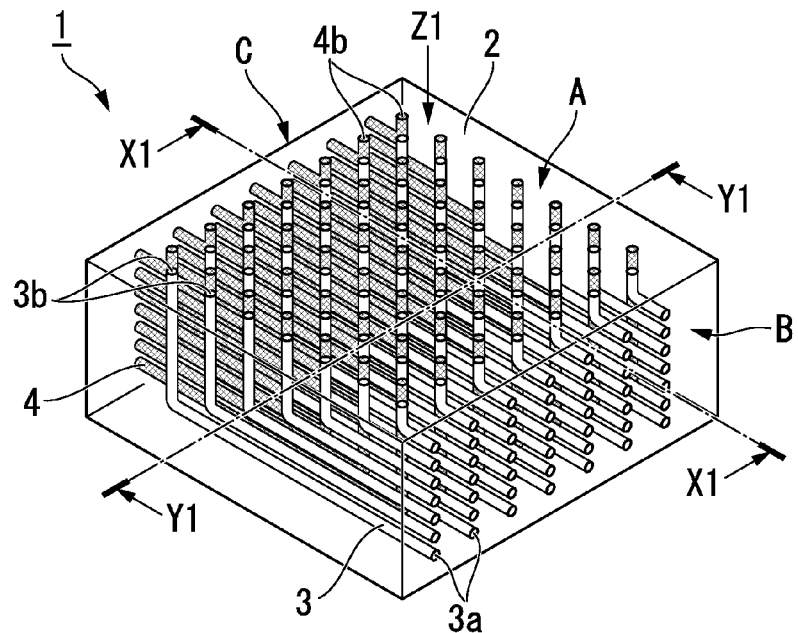
FIG. 1A is a schematic view illustrating a configuration example of a fluid control device according to a first embodiment, and a perspective view schematically illustrating a fluid control device 1.

FIG. 1A is a schematic view illustrating a configuration example of a fluid control device 1 according to the present embodiment, and a perspective view schematically illustrating the fluid control device 1.

Figure 1B:
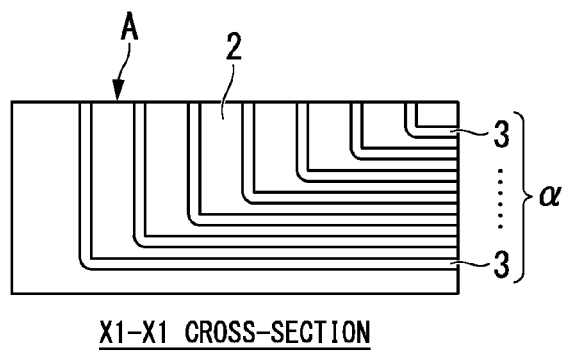
FIG. 1B is a schematic cross-sectional view obtained by cutting along an arrow X1-X1 in the perspective view of FIG. 1A.
Figure 1C:
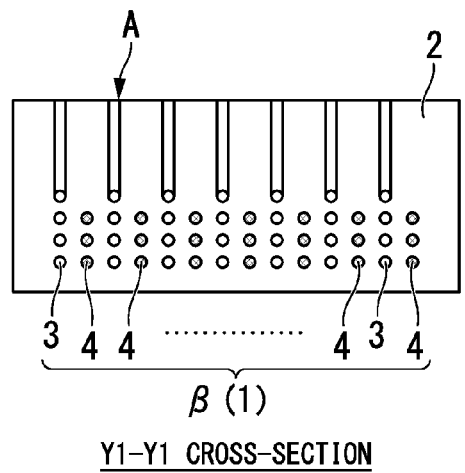
FIG. 1C is a schematic cross-sectional view obtained by cutting along an arrow Y1-Y1 in the perspective view of FIG. 1A.
Figure 1D:
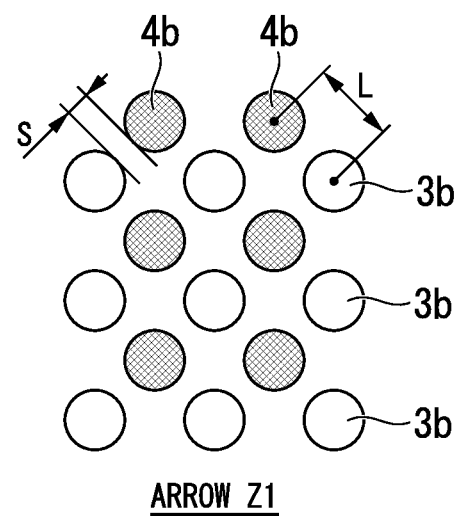
FIG. 1D is a plan view viewed in an arrow Z1 direction in the perspective view of FIG. 1A.

FIG. 1B is a schematic cross-sectional view obtained by cutting along an arrow X1-X1, FIG. 1C is a schematic cross-sectional view obtained by cutting along an arrow Y1-Y1, and FIG. 1D is a plan view viewed in an arrow Z1 direction.

Hereinafter, a first embodiment according to the invention will be described with reference to the drawings.

As illustrated in FIGS. 1A to 1D, the fluid control device 1 includes micro holes 3 and 4 formed in a monolithic base body 2.

Among a plurality of the micro holes 3 and 4 the micro holes in a flow channel group α that configures a specific group have opening portions 3a and 3b respectively in a region A and a region B on surfaces (outer surfaces) of the base body 2, and the micro holes in a flow channel group β (1) that configures the other specific group have opening portions 4a and 4b respectively in the region A and a region C on the surfaces (outer surfaces) of the base body 2.

In addition, in the base body 2, the micro holes 3 and 4 belonging to the flow channel groups α and β (1) are disposed apart from other micro holes throughout the entire lengths.

As illustrated in the schematic cross-sectional views of FIGS. 1B and 1C, the micro holes 3 provided in the monolithic base body 2 form the three-dimensional flow channel group α communicated with the region A and the region B on the surfaces (outer surfaces) of the base body 2.

At the same time, the micro holes 4 form the three-dimensional flow channel group β (1) communicated with the region A and the region C on the surfaces (outer surfaces) of the base body 2.

The opening portions 3b and 4b in the flow channel group α and the flow channel group β (1) provided on the region A are two-dimensionally arrayed in a plane facing the region A as illustrated in FIG. 1D.

In addition, the opening portions are alternately formed in locations most adjacent to each other.

In FIG. 1D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

It is possible to control the diffusion length using the "pitch".

As the diffusion length decreases, the mixing rate can be increased.

However, when the pitch between the flow channel groups is narrowed in order to increase the mixing rate, the designable micro hole diameter also decreases naturally.

When the diameter of the micro hole is small, there will be adverse effects such as an increase in the capillary force, an increase in the pressure loss and the like.

On the other hand, when the diameter of the micro hole is large, the pitch between the flow channel groups naturally becomes larger, and the mixing properties deteriorate.

The preferable range of the pitch is 5 to 100 μm, more preferably 7 to 90 μm, still more preferably 9 to 65 μm, and yet still more preferably 10 to 55 μm.

In addition, when the space is small, the thickness of a side wall of the micro hole becomes thinner, and the side wall is broken when a fluid flows in.

On the other hand, when the space is large, different liquids do not immediately blend with each other in a vicinity of the region A, and therefore the blending of the liquids is hindered.

The preferable range of the space is 2 to 50 μm, and more preferably 3 to 30 μm.

The preferable ranges of the pitch and the space are described with an assumption that the cross-sectional shape of the micro hole is a perfect circle, and, even in a case in which the cross-sectional shape is not a perfect circle, the preferable ranges may be in the above ranges with an assumption that the cross-sectional shape is approximately a perfect circle.

Modification Example 1

Figure 2A:
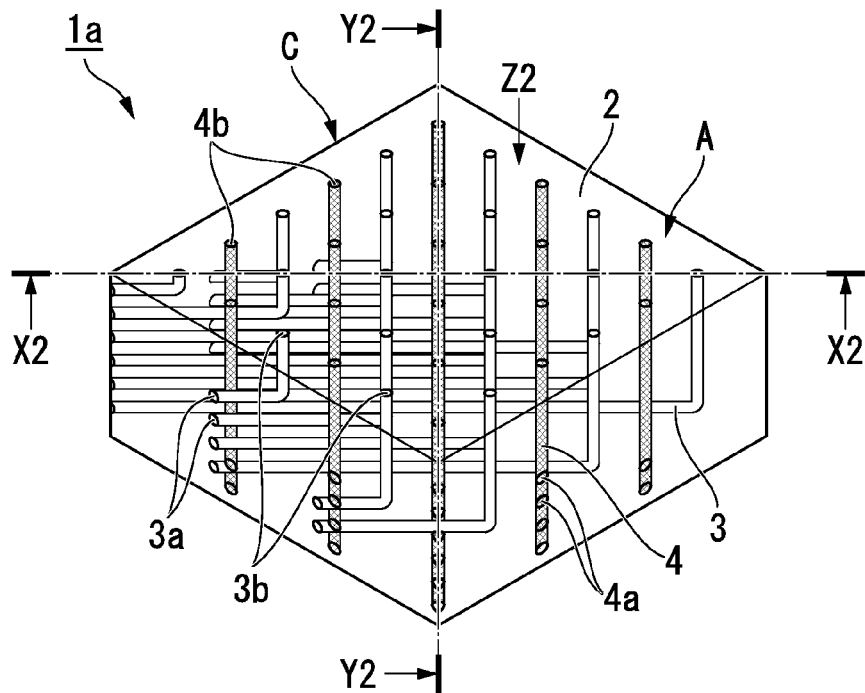

FIG. 2A is a schematic view illustrating a modification example of a fluid control device 1 according to the embodiment, and a perspective view schematically illustrating the fluid control device 1a.

Figure 2B:
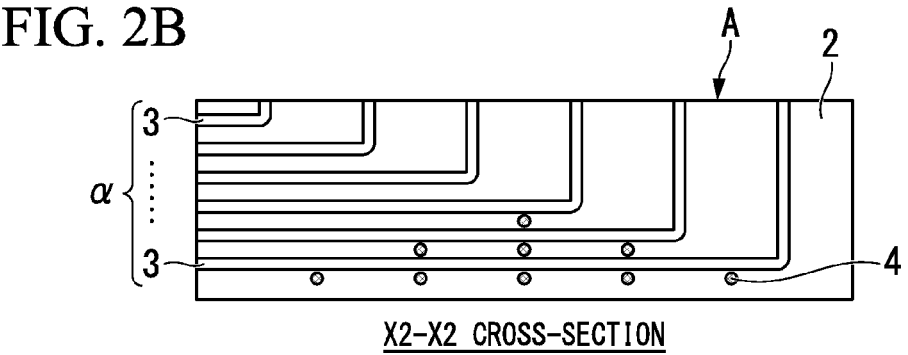
FIG. 2B is a schematic cross-sectional view obtained by cutting along an arrow X2-X2 in the perspective view of FIG. 2A.
Figure 2C:
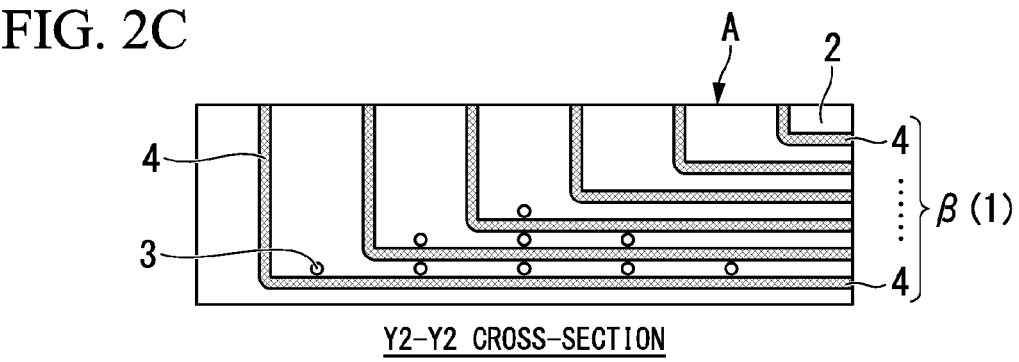
FIG. 2C is a schematic cross-sectional view obtained by cutting along an arrow Y2-Y2 in the perspective view of FIG. 2A.
Figure 2D:
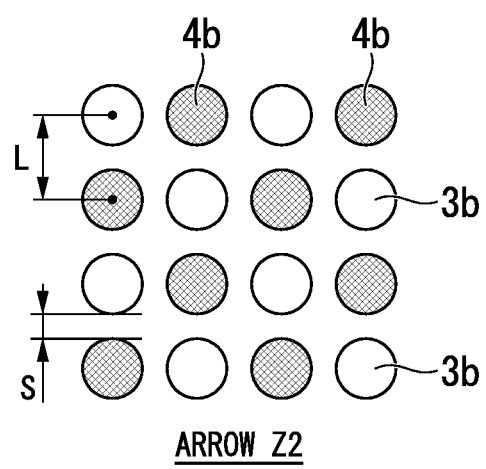
FIG. 2D is a plan view viewed in an arrow Z2 direction in the perspective view of FIG. 2A.

FIG. 2B is a schematic cross-sectional view obtained by cutting along an arrow X2-X2, FIG. 2C is a schematic cross-sectional view obtained by cutting along an arrow Y2-Y2, and FIG. 2D is a plan view viewed in an arrow Z2 direction.

When the three-dimensional layout of the micro holes illustrated in FIGS. 1A to 1D is appropriately changed, it is possible to dispose the opening portions in the flow channel group α and the flow channel group β (1) in a houndstooth check shape (FIG. 2D) in the region A as the opening portions in the fluid control device 1a illustrated in FIGS. 2A to 2D.

In FIG. 2D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

The diameters of the micro holes 3 and 4 are preferably set to, for example, a micrometer or nanometer order in the region A.

The preferable range of the diameter is 3 to 50 μm, more preferably 5 to 40 μm, and still more preferably 7 to 35 μm.

In addition, the pitches L between the micro holes 3 and 4 are preferably set to, for example, a micrometer or nanometer order.

The reason for setting the diameter and the pitch in the above ranges is that, in a case in which a plurality of kinds of fluids are sprayed outside the region A through the micro holes 3 and 4 and the fluids are mixed, the treatment capability improves.

Additionally, in the invention (for example, in the description of the fluid control device 1 according to the embodiment), "mixing" refers to the mixing, reacting or emulsifying of a plurality of fluids (hereinafter, "mixing" will be used with the same meaning in the description of a fluid mixer and μTAS as well).

The number of the micro holes 3 and 4 that configure the flow channel group α and the flow channel group β (1) is not particularly limited, and can be appropriately selected depending on the kind and treatment capability of a fluid being controlled.

In addition, the region B and the region C may be set to different regions on the same base body surface as illustrated in the schematic view of FIG. 7C described below.

Furthermore, while not illustrated herein, the region A, the region B, the region C, and others may be all present on the same surface.

Modification Example 2

Figure 3A:
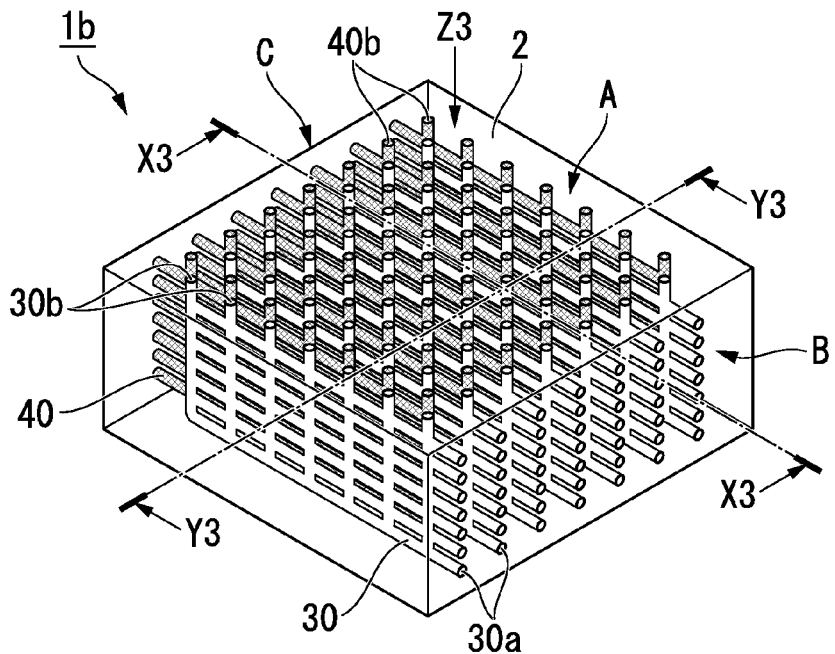
FIG. 3A is a schematic view illustrating a fluid control device 1b according to a modification example of the first embodiment, and a perspective view schematically illustrating the fluid control device 1b.

FIG. 3A is a schematic view illustrating a modification example of the fluid control device 1 according to the embodiment, and a perspective view schematically illustrating the fluid control device 1b.

Figure 3B:
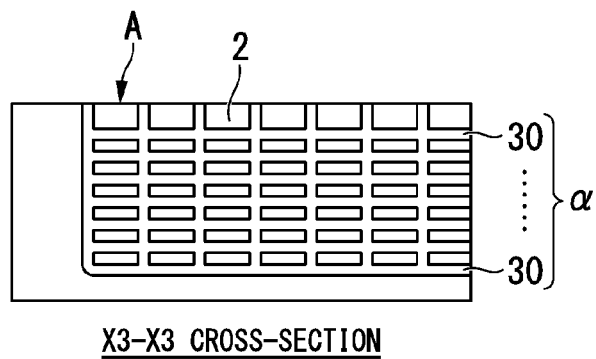
FIG. 3B is a schematic cross-sectional view obtained by cutting along an arrow X3-X3 in the perspective view of FIG. 3A.
Figure 3C:
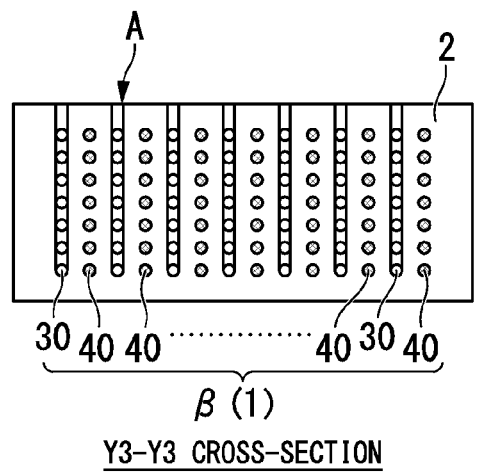
FIG. 3C is a schematic cross-sectional view obtained by cutting along an arrow Y3-Y3 in the perspective view of FIG. 3A.
Figure 3D:
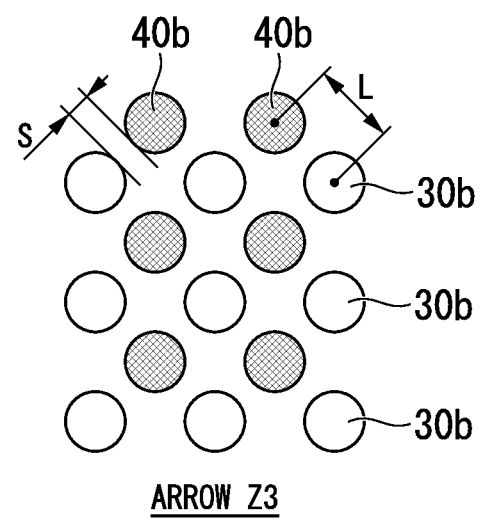
FIG. 3D is a plan view viewed in an arrow Z3 direction in the perspective view of FIG. 3A.

FIG. 3B is a schematic cross-sectional view obtained by cutting along an arrow X3-X3, FIG. 3C is a schematic cross-sectional view obtained by cutting along an arrow Y3-Y3, and FIG. 3D is a plan view viewed in an arrow Z3 direction.

The fluid control device 1a includes a plurality of micro holes 30 and 40 formed in the monolithic base body 2.

The flow channel group α made up of the micro holes 30 have opening portions 30a and 30b respectively in the region A and the region B on the surfaces (outer surfaces) of the base body 2, and the flow channel group β (1) that is made up of the micro holes 40 and configures the other group have opening portions 40a and 40b respectively in the region A and the region C on the surfaces (outer surfaces) of the base body 2.

A first flow channel group α and a second flow channel group β (1) have the micro holes 30 and 40 that communicate the region B, the region C, and the region A in plural mesh shapes in the base body 2.

The respective micro holes 30 and 40 communicated with each other in the mesh shapes are disposed in parallel apart from each other.

In addition, the flow channel group α and the flow channel group β (1) intersect each other so as to form three-dimensional flow channel groups among the region B, the region C, and the region A.

The opening portions 30b and 40b in the flow channel group α and the flow channel group β (1) provided in the region A are two-dimensionally arrayed in the plane facing the region A as illustrated in FIG. 3D.

In addition, the opening portions are alternately formed in locations most adjacent to each other.

In FIG. 3D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

Modification Example 3

Figure 4A:
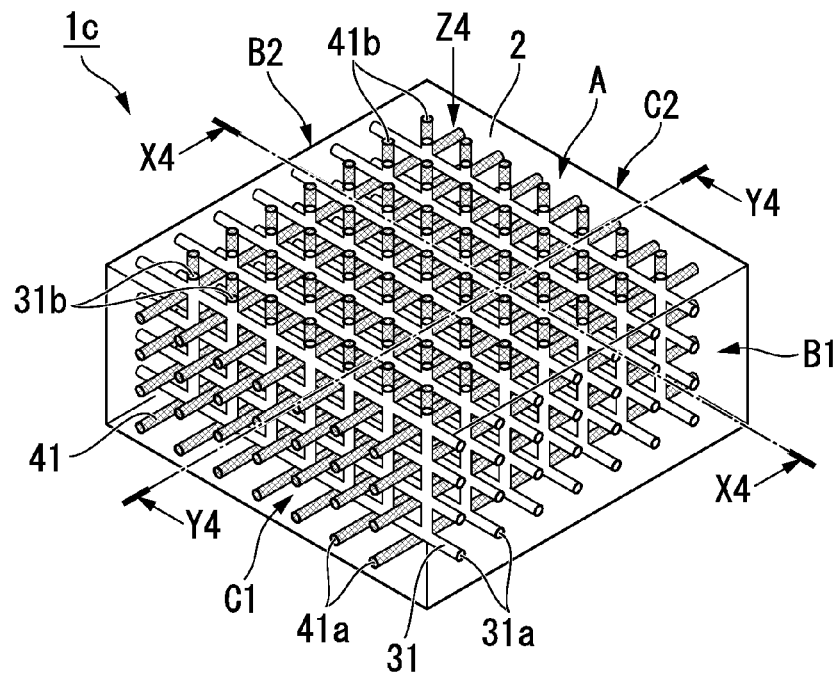
FIG. 4A is a schematic view illustrating a fluid control device 1c according to a modification example of the first embodiment, and a perspective view schematically illustrating the fluid control device 1c.

FIG. 4A is a schematic view illustrating a modification example of the fluid control device according to the embodiment, and a perspective view schematically illustrating the fluid control device 1c.

Figure 4B:
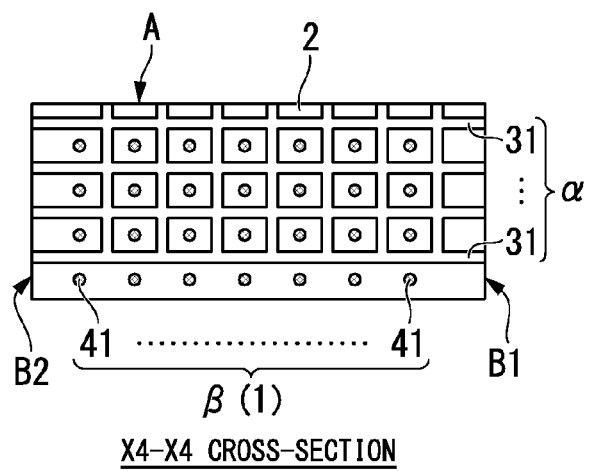
FIG. 4B is a schematic cross-sectional view obtained by cutting along an arrow X4-X4 in the perspective view of FIG. 4A.
Figure 4C:
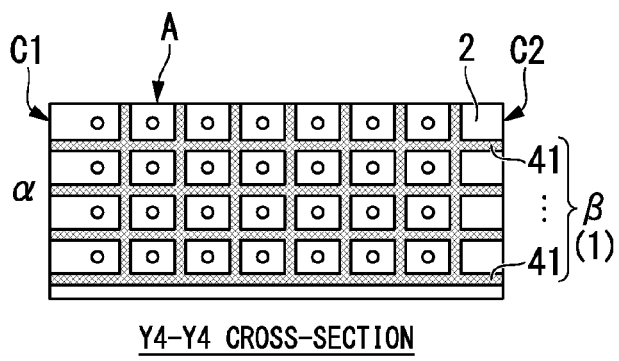
FIG. 4C is a schematic cross-sectional view obtained by cutting along an arrow Y4-Y4 in the perspective view of FIG. 4A.
Figure 4D:
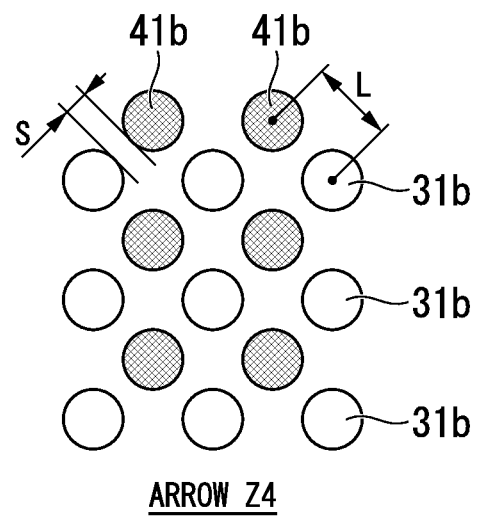
FIG. 4D is a plan view viewed in an arrow Z4 direction in the perspective view of FIG. 4A.

FIG. 4B is a schematic cross-sectional view obtained by cutting along an arrow X4-X4, FIG. 4C is a schematic cross-sectional view obtained by cutting along an arrow Y4-Y4, and FIG. 4D is a plan view viewed in an arrow Z4 direction.

The fluid control device 1c includes a plurality of micro holes 31 and 41 formed in the monolithic base body 2.

The flow channel group α made up of the micro holes 31 has opening portions 31a and 31b respectively in the region A and the regions B1 and B2 which face each other on the surfaces (outer surfaces) of the base body 2, and the flow channel group β (1) that is made up of the micro holes 41 and configures the other group has opening portions 41a and 41b respectively in the region A and the regions C1 and C2 which face each other on the surfaces (outer surfaces) of the base body 2.

The flow channel group α and the flow channel group β (1) have the micro holes 31 and 41 that communicate the regions B1, B2, the regions C1, C2, and the region A in multiple mesh shapes in the base body 2.

The micro holes 31 and 41 communicated with each other in the mesh shapes are disposed apart from each other, and the micro holes 31 penetrate spaces in the meshes of the micro holes 41.

In addition, the flow channel group α and the flow channel group β (1) intersect each other so as to form three-dimensional flow channel groups among the regions B1, B2, the regions C1, C2 and the region A.

The respective opening portions 31b and 41b in the flow channel group α and the flow channel group β (1) provided in the region A are two-dimensionally arrayed in the plane facing the region A as illustrated in FIG. 4D.

In addition, the opening portions are alternately formed in locations most adjacent to each other.

In FIG. 4D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

Modification Example 4

Figure 5A:
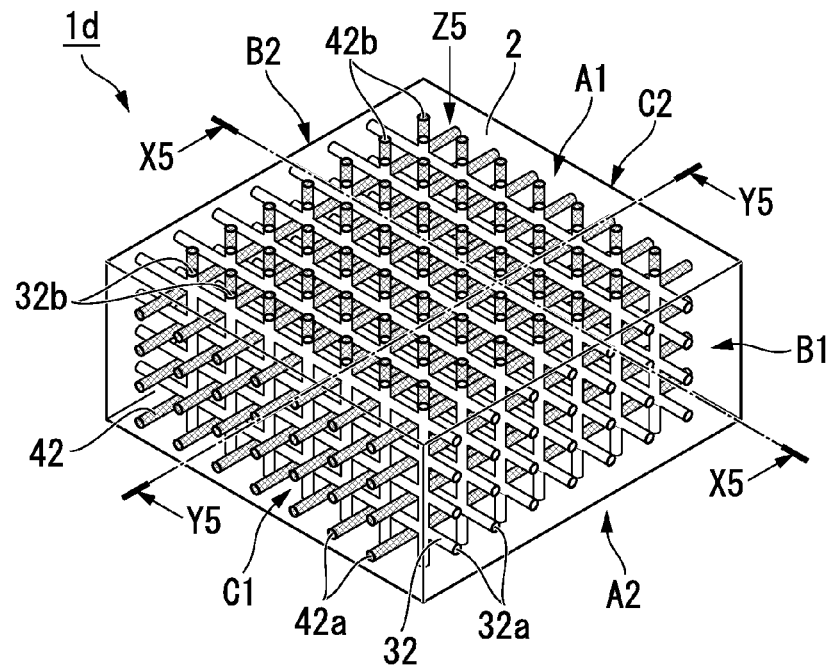
FIG. 5A is a schematic view illustrating a fluid control device 1d according to a modification example of the first embodiment, and a perspective view schematically illustrating the fluid control device 1d.

FIG. 5A is a schematic view illustrating a modification example of the fluid control device according to the embodiment, and a perspective view schematically illustrating a fluid control device 1d.

Figure 5B:
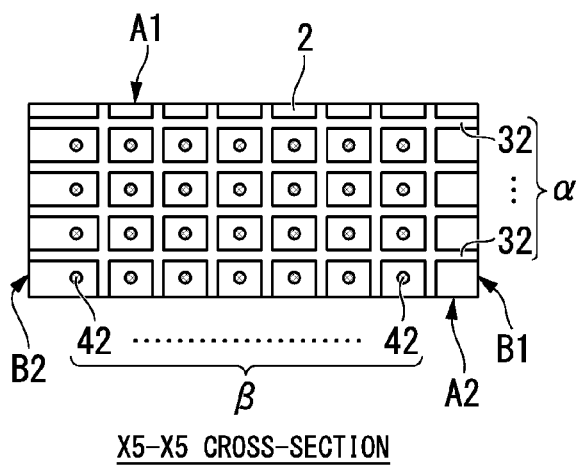
FIG. 5B is a schematic cross-sectional view obtained by cutting along an arrow X5-X5 in the perspective view of FIG. 5A.
Figure 5C:
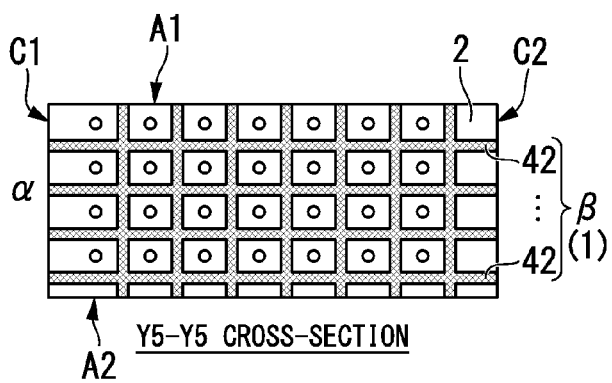
FIG. 5C is a schematic cross-sectional view obtained by cutting along an arrow Y5-Y5 in the perspective view of FIG. 5A.
Figure 5D:
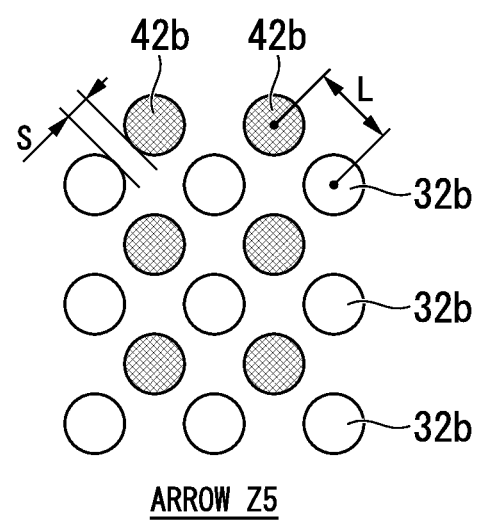
FIG. 5D is a plan view viewed in an arrow Z5 direction in the perspective view of FIG. 5A.

FIG. 5B is a schematic cross-sectional view obtained by cutting along an arrow X5-X5, FIG. 5C is a schematic cross-sectional view obtained by cutting along an arrow Y5-Y5, and FIG. 5D is a plan view viewed in an arrow Z5 direction.

The fluid control device 1d includes a plurality of micro holes 32 and 42 formed in the monolithic base body 2.

The flow channel group α made up of the micro holes 32 has opening portions 32a and 32b respectively in the regions A1 and A2 which face each other and the regions B1 and B2 which face each other on the surfaces (outer surfaces) of the base body 2, and the flow channel group β (1) that is made up of the micro holes 42 and configures the other group has opening portions 42a and 42b respectively in the regions A1 and A2 which face each other and the regions C1 and C2 which face each other on the surfaces (outer surfaces) of the base body 2.

The flow channel group α and the flow channel group β (1) have the micro holes 32 and 42 that communicate the regions B1, B2, the regions C1, C2, the regions A1 and A2 in multiple mesh shapes in the base body 2.

The micro holes 32 and 42 communicated with each other in the mesh shapes are disposed apart from each other, and the micro holes 32 penetrate spaces in the meshes of the micro holes 42.

In addition, the flow channel group α and the flow channel group β (1) intersect each other so as to form three-dimensional flow channel groups among the regions B1, B2, the regions C1, C2, the regions A1 and A2.

The opening portions 32b and 42b in the flow channel group α and the flow channel group β (1) provided in the regions A1 and A2 are two-dimensionally arrayed in the plane facing the region A1 (A2) as illustrated in FIG. 5D.

In addition, the opening portions are alternately formed in locations most adjacent to each other.

In FIG. 5D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

Modification Example 5

Figure 6A:
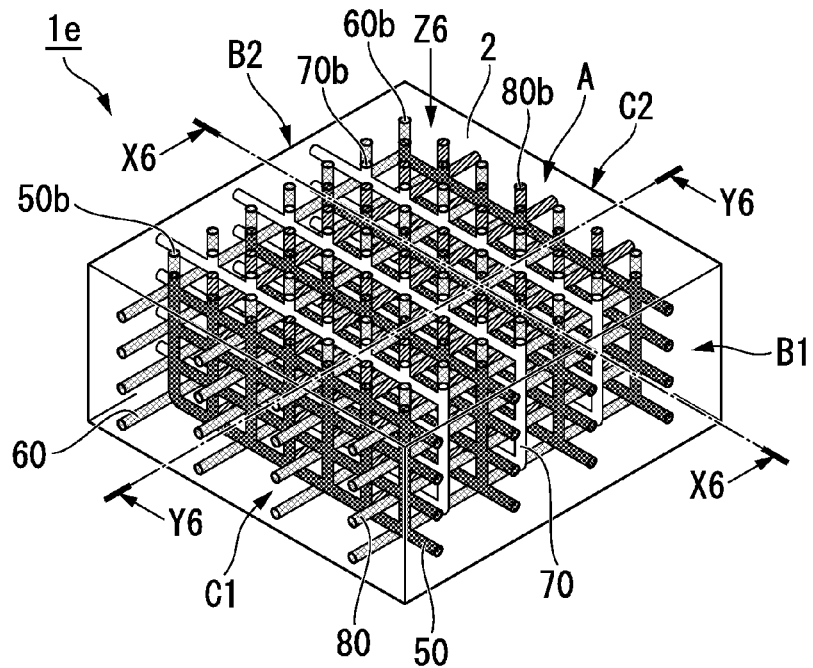
FIG. 6A is a schematic view illustrating a fluid control device 1e according to a modification example of the first embodiment, and a perspective view schematically illustrating the fluid control device 1e.

FIG. 6A is a schematic view illustrating a modification example of a fluid mixer according to the embodiment, and a perspective view schematically illustrating a fluid control device 1e.

Figure 6B:
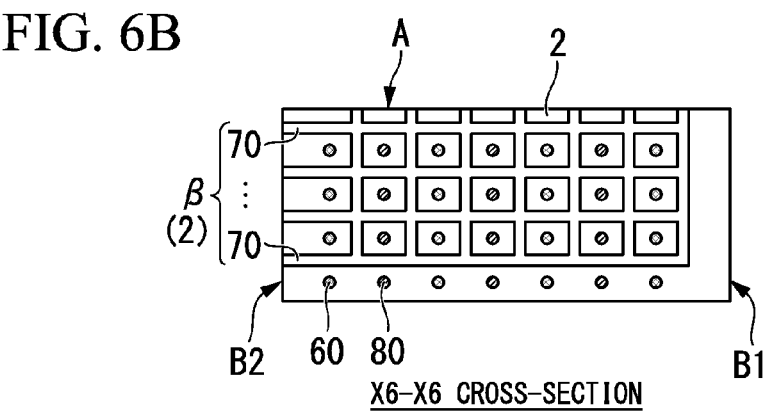
FIG. 6B is a schematic cross-sectional view obtained by cutting along an arrow X6-X6 in the perspective view of FIG. 6A.
Figure 6C:
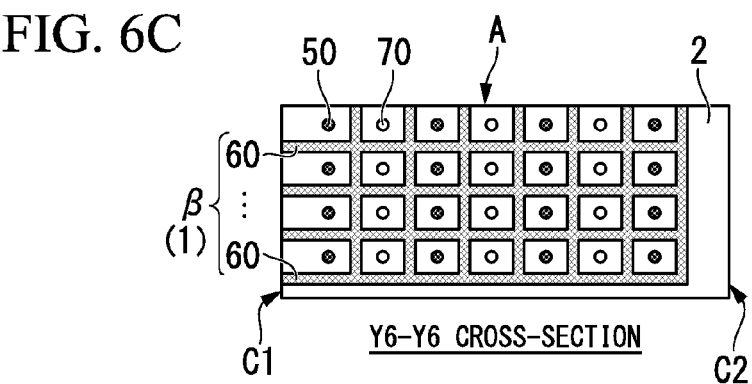
FIG. 6C is a schematic cross-sectional view obtained by cutting along an arrow Y6-Y6 in the perspective view of FIG. 6A.
Figure 6D:
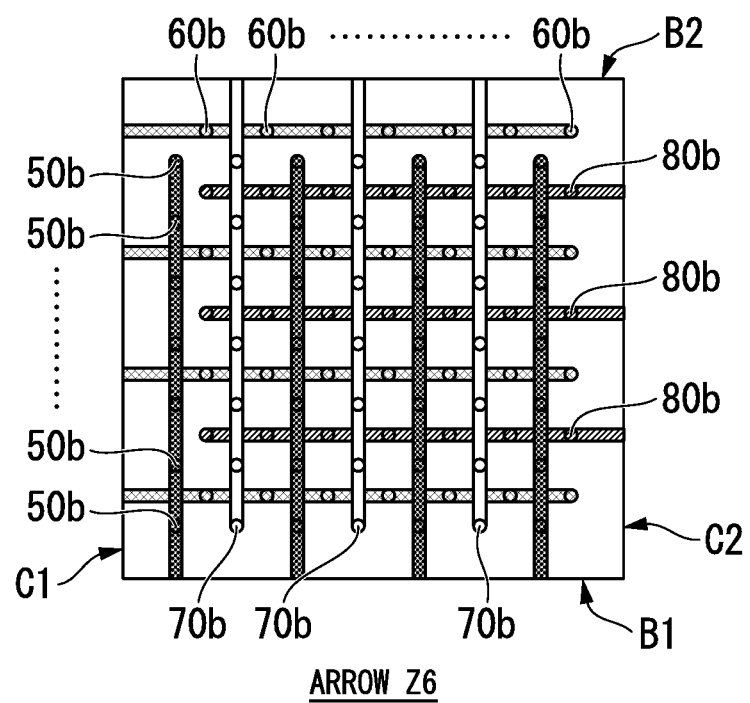
FIG. 6D is a plan view viewed in an arrow Z6 direction in the perspective view of FIG. 6A.

FIG. 6B is a schematic cross-sectional view obtained by cutting along an arrow X6-X6, FIG. 6C is a schematic cross-sectional view obtained by cutting along an arrow Y6-Y6, and FIG. 6D is a plan view viewed in an arrow Z6 direction.

The fluid control device 1e includes a plurality of micro holes 50, 60, 70, and 80 formed in the monolithic base body 2.

The flow channel group α made up of the micro holes 50 has opening portions 50a and 50b respectively in the region A and the region B1 on the surfaces (outer surfaces) of the base body 2.

The flow channel group β (1) that is made up of the micro holes 60, 60, and configures another group has opening portions 60a and 60b respectively in the region A and the region C1 on the surfaces (outer surfaces) of the base body 2.

A flow channel group β (2) that is made up of the micro holes 70 and configures still another group has opening portions 70a and 70b respectively in the region A and the region B2 on the surfaces (outer surfaces) of the base body 2.

A flow channel group β (3) that is made up of the micro holes 80 and configures the other group has opening portions 80a and 80b respectively in the region A and the region C2 on the surfaces (outer surfaces) of the base body 2.

In the base body 2, the flow channel groups form four configurations in regions in facing locations in which a plurality of the micro holes 50, 60, 70, and 80 communicated with the regions are communicated in plural mesh shapes, the respective micro holes 50, 60, 70, and 80 communicated with each other in the mesh shapes are disposed apart from each other, and the micro holes penetrate spaces in the meshes of the other micro holes.

The micro holes 50, 60, 70, and 80 communicated in the mesh shapes are all communicated with the common region A.

In addition, the flow channel groups intersect each other so as to form three-dimensional flow channel groups among the regions B1 and B2 which are located opposite to each other, the regions C1 and C2 which are located opposite to each other, and the region A.

The respective opening portions 50b, 60b, 70b, and 80b in the respective flow channel groups provided in the region A are two-dimensionally arrayed in the plane facing the region A as illustrated in FIG. 6D.

In addition, the opening portions are alternately formed in locations most adjacent to each other.

In FIG. 6D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

Figure 7:
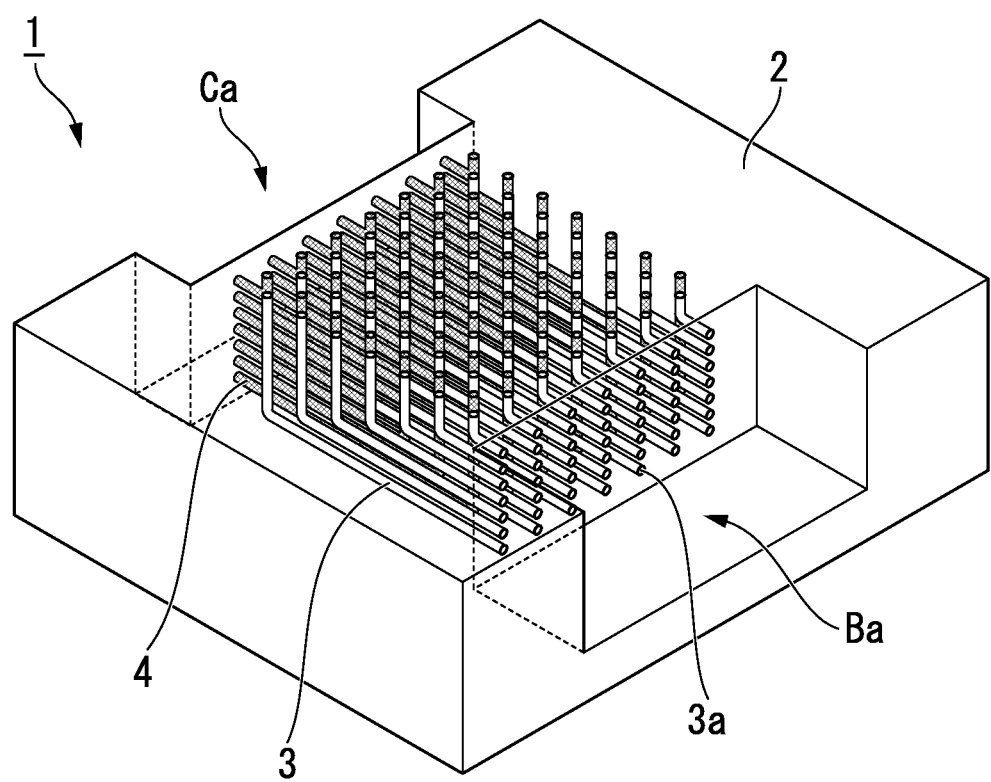
FIG. 7 is a schematic view for describing a filter function of the fluid control device 1.

FIG. 7 is a schematic view for describing a filter function of the fluid control device 1.

When, for example, the opening portions 3a and 4a on the inflow side of the respective micro holes 3 and 4 provided on regions Ba and Ca of the base body 2 which serve as inflow openings of a fluid are formed to have a hole diameter that is equal to or larger than the diameters of particles and the like that configure a fluid being made to flow in as illustrated in FIG. 7, it is possible to block, for example, foreign substances and the like larger than the particles and the like.

Additionally, the size of a filter portion provided in the opening portions 3a and 4a can be appropriately determined depending on the kind of a fluid.

In addition, the filter function can be formed by collectively irradiating laser beams on the base body so as to form a plurality of modified regions, and then removing the modified regions formed in the base body through etching as described below.

(2) A Manufacturing Method of the Fluid Control Device

Next, a manufacturing method of the fluid control device 1 will be described.

Meanwhile, the respective fluid control devices according to the modification examples of the fluid control device 1 are also manufactured in the same manner as the fluid control device 1.

A manufacturing method of the fluid control device 1 of the embodiment includes a step of collectively irradiating laser beams with a pulse width for which the pulse time width is in a picosecond order or less on the inside of the base body 2, thereby forming a plurality of modified regions and a step of removing the modified region formed in the base body 2 through etching, thereby forming flow channels.

(2.1) the Step of Forming Modified Regions

First, laser beams were irradiated on regions in the base body 2 which will form flow channels.

As a light source of the laser beams, for example, femtosecond laser beams can be used.

The femtosecond laser refers to a laser having a pulse time width in a femtosecond (fs) order.

While having an ultra-short pulse in a range of several femtoseconds to several hundred femtoseconds, the femtosecond laser has a characteristic of having one pulse with a high peak intensity and induces multiphoton absorption which is a non-linear optical phenomenon in the vicinity of the focal point, and therefore the femtosecond laser can change the properties of the base body 2, which is a workpiece, in the vicinity of the focal point, thereby forming micro modified regions.

At this time, as the base body 2 which is a material being worked, for example, a transparent material such as a glass material is preferably used.

In addition, the modified regions can be formed similarly even when the pulse time width is less than 10 ps, and, when the pulse time width is less than 3 ps, and preferably less than 2 ps, the modified regions can be formed more reliably.

The laser beams begin to be irradiated on, for example, one main surface of the base body 2, and a light collecting portion S is scanned so that at least two layers of flow channels being formed are disposed in parallel in the base body 2.

In addition, the light collecting portion S is scanned so that modified regions which will form flow channels begin to be formed from the far side from the laser beam source.

As a result, modified region which will form flow channels can be three-dimensionally formed in the base body 2.

In addition, it is possible to produce the modified regions that can form a desired flow channel diameter by appropriately adjusting the output of the laser beams being irradiated depending on fluids being mixed.

It is desirable that the irradiation intensity be preferably equal to or larger than the work threshold value of a material that configures the base body 2, and more preferably equal to or larger than a threshold value at which the surface of the base body 2 can be abraded, a so-called abrasion threshold value.

Furthermore, when forming the modified regions, regarding the direction in which the laser beams are irradiated, the laser beams may be irradiated only on one or the other main surface of the base body or irradiated on both main surfaces of the base body.

In addition, in a case in which a resin material such as an acrylic resin is used for the base body 2, three-dimensional flow channels can be formed only with laser irradiation without using the step of forming flow channels through wet etching described below.

(2.2) the Step of Forming Flow Channels

The base body 2 in which regions that will form flow channels have been modified through the step of forming modified regions is immersed in an etchant (medicinal solution) so as to wet-etch the modified regions, thereby removing the modified regions from the base body.

A group of flow channels is three-dimensionally formed in the base body 2 from which the modified regions have been removed.

In the fluid control device 1 according to the embodiment, silica glass was used for the base body 2, and a solution mainly containing hydrofluoric acid (HF) was used as the etchant.

In the etching treatment, a phenomenon in which the modified regions are etched at an etching rate that is several tens of times faster than the etching rate for regions on which the laser beams are not irradiated.

Therefore, it is possible to selectively etch and remove only regions which have been irradiated with the laser beams and are supposed to form flow channels by controlling the etching time, and it is possible to three-dimensionally form a group of flow channels as a fixed structure in the base body 2 using the selectivity of the etching.

The etchant is not particularly limited, and examples of the etchant that can be used include fluonitric acid-based acid mixtures obtained by adding an appropriate amount of nitric acid or the like to hydrofluoric acid and alkalis such as KOH in addition to the solution mainly containing hydrofluoric acid (HF).

In addition, it is also possible to use other medicinal solutions depending on the material of the base body 2.

(3) Actions and Effects

The fluid control device 1 according to the embodiment includes the plurality of the independent micro holes formed in the monolithic base body 2.

The plurality of the micro holes in the flow channel group α that configures a specific group and the flow channel group β (n) that configures the other specific group respectively have opening portions in the regions B and C through which a fluid is made to flow in and the region A through which a fluid is made to flow out on the surfaces (outer surfaces) of the base body 2, and form three-dimensional flow channel groups that are communicated with the region A and the region B or C.

The opening portions in the flow channel group α and the flow channel group β (n) provided in the region A are two-dimensionally arrayed in the plane facing the region A.

In addition, among the opening portions of the micro holes that respectively configure the flow channel group α and the flow channel group β (n), the opening portions communicated with the region A are alternately formed in locations most adjacent to each other.

Therefore, in the fluid control device 1 according to the invention, it is possible to independently control the flows of a plurality of kinds of fluids that are made to flow in through the regions B and C without allowing the fluids to be mixed until the fluids are made to flow out through the region A.

Therefore, there is no concern that solid contents and the like generated due to the plurality of the fluids mixed in the flow channels may gradually accumulate in the flow channels so as to partially close the flow channels.

In addition, since a plurality of the flow channel groups are three-dimensionally stacked in the base body 2, it is possible to provide a significantly large number of flow channels compared to two dimensional flow channels, and the treatment capability and the productivity can be improved.

Furthermore, since the flow channel groups in the base body 2 form an integrated continuous body, there is no liquid leakage in the joining interface, and it is possible to improve the pressure resistance performance.

Second Embodiment (1) the Entire Configuration of the Fluid Mixer

Figure 8A:
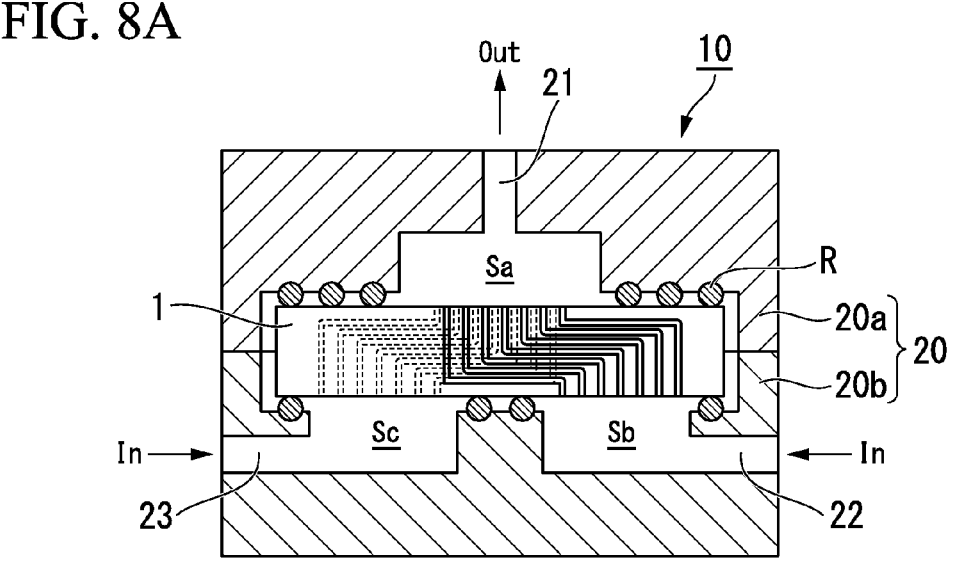
FIG. 8A is a schematic view illustrating a configuration example of a fluid mixer 10 according to a second embodiment, and a schematic cross-sectional view of the fluid mixer 10.

FIG. 8A is a schematic view illustrating a configuration example of a fluid mixer 10 according to the present embodiment, and a schematic cross-sectional view of the fluid mixer 10.

Figure 8B:
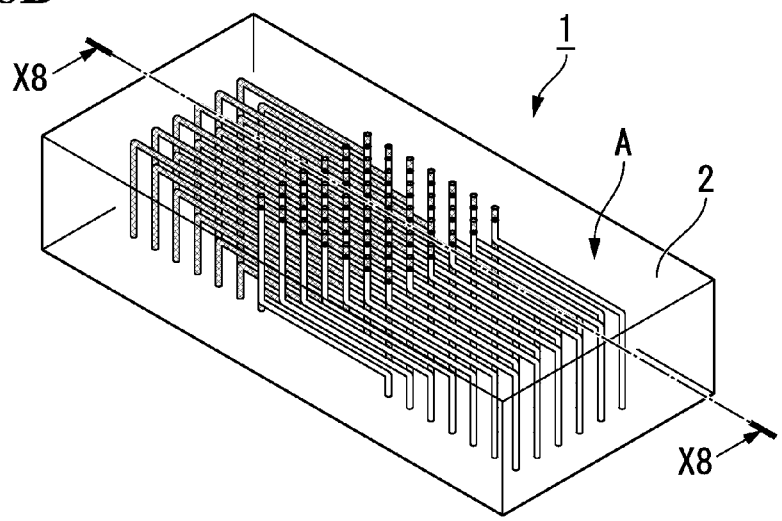
FIG. 8B is a perspective view schematically illustrating the fluid control device 1 that configures the fluid mixer 10 of FIG. 8A.
Figure 8C:
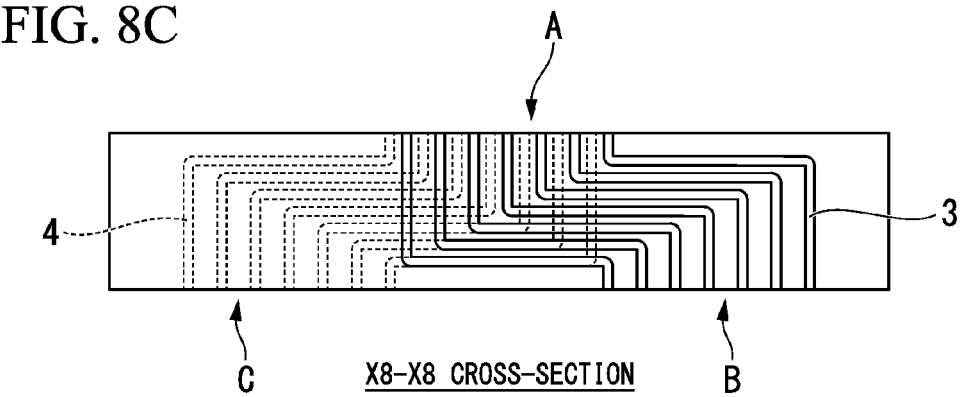
FIG. 8C is a schematic cross-sectional view obtained by cutting along an arrow X8-X8 in the perspective view of FIG. 8B.

FIG. 8B is a perspective view schematically illustrating the fluid control device 1 that configures the fluid mixer 10, and FIG. 8C is a schematic cross-sectional view obtained by cutting along an arrow X8-X8 in the fluid control device 1.

Hereinafter, a second embodiment according to the invention will be described with reference to the drawings.

As illustrated in FIG. 8A, the fluid mixer 10 is made up of the fluid control device 1 in which a plurality of the micro holes 3 and 4 that serve as flow channels are formed; and a housing 20 which accommodates the fluid control device 1 and includes a monolithic outflow space Sa facing the region A of the fluid control device 1 and inflow spaces Sb and Sc separately facing the region B and the region C of the fluid control device 1.

As the housing 20, a housing made of metal such as stainless steel can be used.

The fluid control device 1 includes a plurality of the respectively independent micro holes 3 and 4 that serve as flow channels formed in the monolithic base body 2.

The plurality of the micro holes have opening portions respectively in the regions B and C through which a fluid is made to flow in and in the region A through which a fluid is made to flow out on the surfaces (outer surfaces) of the base body 2, and form three-dimensional flow channel groups that are communicated with the region A, the region B and the region C (refer to FIGS. 8B and 8C).

The housing 20 is made up of a top housing 20a that faces the surface (outer surface) of the region A in the base body 2 that configures the fluid control device 1 so as to form the outflow space Sa and a bottom housing 20b that faces the surfaces (outer surfaces) of the regions 13 and C in the base body 2 so as to form the inflow spaces Sb and Sc.

In addition, the surfaces (outer surfaces) of the regions A, B and C of the fluid control device 1, the top housing 20a and the bottom housing 20b are joined using sealing members R, thereby forming spaces independent from the outflow space Sa and the inflow spaces Sb and Sc.

As the sealing member, an elastic sealing member such as an O ring can be used.

In the fluid mixer 10, different materials (fluids) are made to flow in through mutually different spaces, for example, the inflow spaces Sb and Sc, to flow through the micro holes 3 and 4 which are flow channels, and to flow out through a common space, for example, the outflow space Sa.

Figure 9:
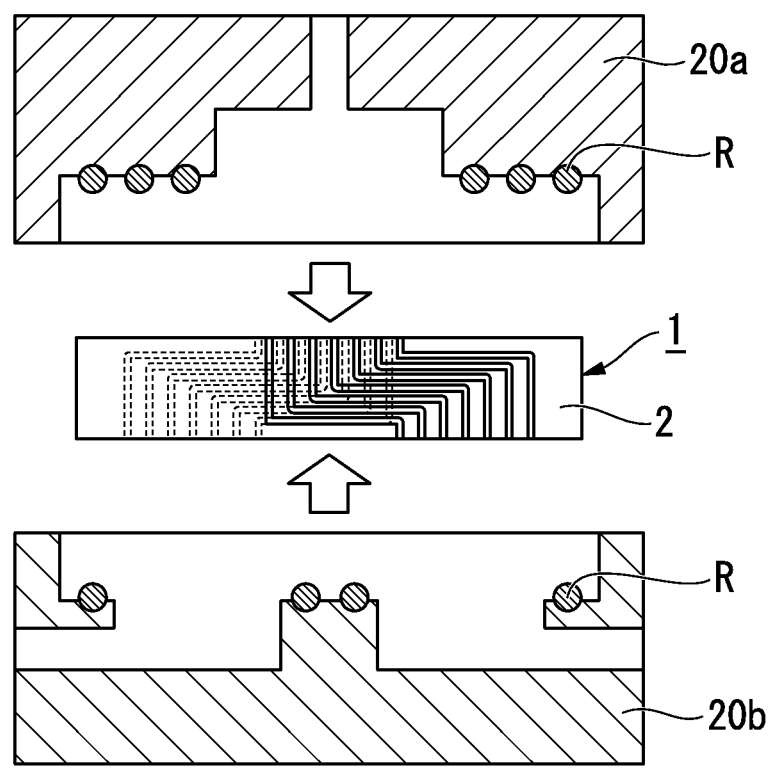
FIG. 9 is a schematic view for describing a configuration of a fluid mixer including the fluid control device 1 that is attachable and detachable.

As illustrated in FIG. 9, the fluid mixer 10 is obtained by sandwiching the fluid control device 1 using the top housing 20a and the bottom housing 20b and joining the chasses, which makes the fluid control device 1 attachable and detachable.

Therefore, the fluid control device can be appropriately selected depending on the kinds and properties of fluids being mixed.

Modification Example

Figure 10A:
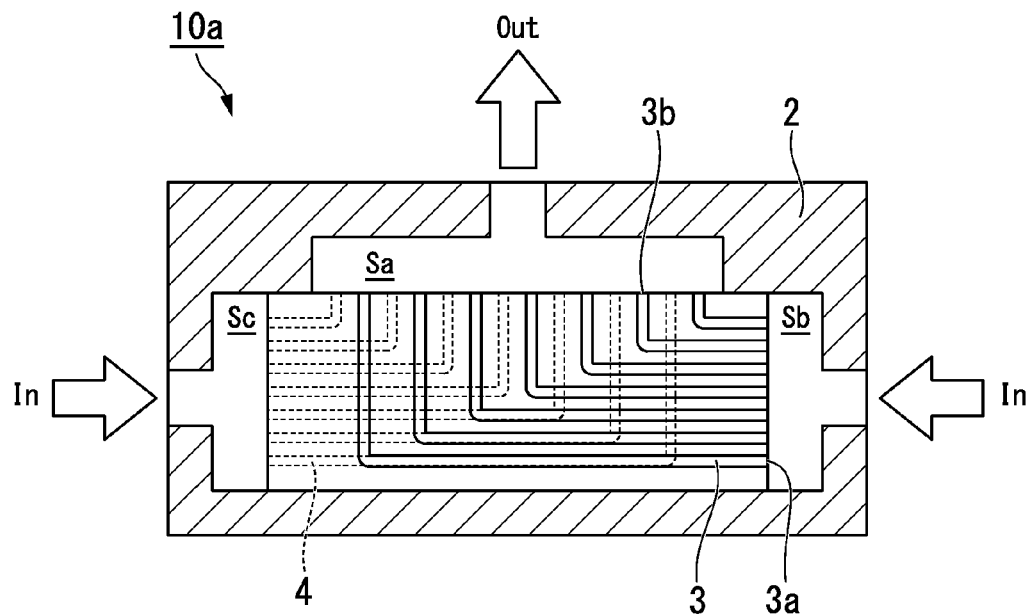

FIG. 10A is a schematic view illustrating a modification example of the fluid mixer 10 according to the embodiment, and a schematic cross-sectional view of a fluid mixer 10a.

Figure 10B:
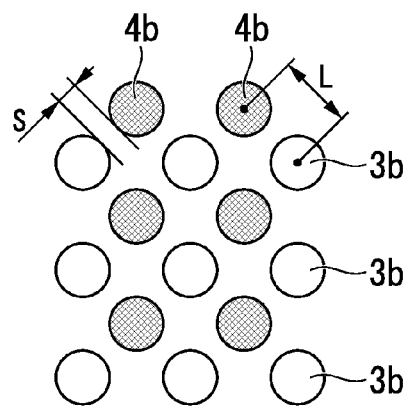
FIG. 10B is a plan view illustrating the disposition of opening portions of flow channels with respect to an outflow space Sa in the fluid mixer 10a of FIG. 10A.

FIG. 10B is a plan view illustrating the disposition of opening portions of flow channels with respect to the outflow space Sa.

As illustrated in FIG. 10A, the fluid mixer 10a includes the plurality of the micro holes 3 and 4 that function as flow channels, the plurality of the inflow spaces Sb and Sc, and the common outflow space Sa in the monolithic base body 2. Also, among the plurality of the micro holes 3 and 4 all the micro holes 3 that configure a group have an opening portion communicated with the inflow space Sb and the other opening portion communicated with the outflow space Sa.

In addition, all the micro holes 4 that configure the other group have an opening portion communicated with the inflow space Sc and the other opening portion communicated with the outflow space Sa.

Furthermore, in FIGS. 10A and 10B, the dividing location of the housing and the sealing members will not be illustrated.

As illustrated in FIG. 10B, the other opening portions 3b of all the micro holes 3 that configure a group and the other opening portions 4b of all the micro holes 4 that configure the other group are two-dimensionally disposed in the plane facing the outflow space Sa.

In the plane facing the outflow space Sa, the other opening portions 3b and 4b of the micro holes 3 and 4 are disposed so that the opening portions communicated with the plurality of the inflow spaces Sb and Sc are formed in locations most adjacent to each other.

In FIG. 10D, reference numeral S represents "space" and refers to the distance between an outer circumferential end of the opening portion 3b and an outer circumferential end of the adjacent opening portion 4b.

Reference numeral L represents "pitch" and refers to the distance between the center (black point) of the opening portion 3b and the center (black point) of the adjacent opening portion 4b.

In more detail, reference numeral S is defined as "the distance between one of the opening portions (exits) of all the micro holes 3 that configure a group in the base body 2 in the outflow space Sa and, among the opening portions (exits) of all the micro holes 4 that configure the other group, the opening portion of the micro hole in a location most adjacent to the micro hole 3 having the above opening portion".

The diameters of the micro holes 3 and 4 provided in the outflow space Sa are preferably set to, for example, a micrometer or nanometer order.

The pitches L between the micro holes 3 and the micro holes 4 are preferably set to, for example, a micrometer or nanometer order.

When the opening portions 3a and 4a on the inflow side of the micro holes 3 and 4 provided on the inflow spaces Sb and Sc that will serve as the inflow openings of fluids are formed to have a hole diameter that is equal to or larger than the diameters of particles and the like that configure a fluid being made to flow in, it is possible to provide a filter function at the inflow openings.

Meanwhile, the depth of a filter portion provided in the opening portions 3a and 4a can be appropriately determined depending on the kind of a fluid.

(2) Actions and Effects (2a) The fluid mixers 10 and 10a according to the embodiment include the plurality of the respectively independent flow channels, the inflow spaces provided with the opening portions of the plurality of the flow channels and the outflow space provided with the other opening portions of the plurality of the flow channels in the monolithic base body 2.

The respective flow channels provided in the monolithic base body form three-dimensional flow channels among the inflow spaces and the outflow space without intersecting each other in a form of a group of flow channels that are communicated with the inflow spaces and the outflow space, and the other opening portions of the micro holes 3 and 4 are formed in locations most adjacent to each other in the plane facing the outflow space Sa.

Therefore, it is possible to improve the mixing efficiency or reactivity of fluids sprayed in the outflow space Sa from the respective opening portions, and it becomes possible to mix liquids that are not easily mixed or blended within a short period of time.

In addition, it becomes possible to easily replace an encapsulated fluid mixer.

Furthermore, the dividing and cleaning of the housing also become possible.

(2b) Since the plurality of the flow channels are three-dimensionally stacked in the base body 2, it is possible to provide a significantly large number of flow channels compared to two dimensional flow channels, and the treatment capability and the productivity can be improved.

Furthermore, since a group of the flow channels in the base body 2 form an integrated continuous body, there is no liquid leakage in the joining interface, and it is possible to improve the pressure resistance performance.

Furthermore, the invention is superior to the conventional art in terms of four points described below.

(2c) A group of the flow channels accommodated in the base body 2 form an integrated body and a continuous body.

Additionally, in the base body 2 in the outflow space Sa, among the opening portions (exits) of all the micro holes 4 that configure the other group, the number of the micro holes most adjacent to one of the opening portions (exits) of all the micro holes 3 that configure a group can be set to four when the opening portions in the outermost circumference are not considered.

Then, it becomes possible to increase the interface surface between two fluids, and not only pressure resistance performance but also mixing properties improve.

(2d) In addition, it is possible to easily increase the amount of fluids being mixed simply by increasing the number of the micro holes.

In the conventional art, in a case in which it was necessary to increase the amount of fluids being mixed by increasing the number of the flow channels, there was no other choice but to increase the number of flow channel one-dimensionally.

In contrast to the conventional art, in the invention, it is possible to increase the number of flow channels in two-dimensional directions.

Therefore, it becomes easy to decrease the sizes of fluid mixing devices.

(2e) In addition, in order to improve the chemical resistance of the fluid mixing device, it is possible to provide a coating layer described below.

In the conventional art, a material with poor chemical resistance is used even in flow channel portions used for mixing.

In a case in which it was necessary to set the flow channel width of the flow channel portion to an 100 μm order or less, it was extremely difficult to carry out chemical resistance coating, for which thick coating was required, on the inner walls of the micro hole flow channels, and it was not possible to improve the chemical resistance.

In contrast to the conventional art, according to the invention, in a case in which glass is used for the base body 2, it is possible to provide favorable chemical resistance to the base body 2.

In addition, since it is possible to carry out the above coating on the housing, consequently, the chemical resistance becomes superior to that of the fluid mixing device of the conventional art.

(2f) Since the fluid mixer of the invention has a high degree of freedom in terms of design, it is also possible to mix a plurality (three or more) of liquids, let alone two liquids.

(3) Other Application Examples (3a) In the fluid mixers 10 and 10*a*, it is preferable to decrease the variation of the pressure loss of the plurality of the micro holes 3 and 4 within ±10%.

That is, it is preferable that the plurality of the micro holes 3 be designed to allow a variation of the pressure loss within ±10% and the plurality of the micro holes 4 be designed to allow a variation of the pressure loss within ±10%.

The pressure loss may be different at the micro hole 3 and at the micro hole 4.

When the variation of the pressure loss is larger than ±10%, there is a possibility that a large variation may occur in terms of the mixing properties of fluids depending on the treatment rate.

(3b) In the fluid mixers 10 and 10*a*, the plurality of the micro holes 3 and 4 preferably have substantially the same length.

Here, "the plurality of the micro holes 3 and 4 having substantially the same length" means that "the flow channel groups α and β have substantially the same length".

That is, it is not necessary for a to be equal top at all times.

When the plurality of the micro holes 3 and 4 that function as flow channels are made to have the same length, it is possible to make fluids flow at a uniform rate at the other opening portions 3*b* and 4*b* of the micro holes 3 and 4 in the plane facing the outflow space Sa.

When fluids are made to flow at a uniform rate at the other opening portions 3*b* and 4*b* of the respective micro holes 3 and 4 which serve as outlets, it is possible to make fluids uniformly flow out and to more uniformly mix fluids.

The flow rate errors at the opening portions 3*b* and 4*b* of the micro holes are preferably within ±100% and more preferably within ±50% from the average value.

When the diameters of the respective micro holes 3 and 4 are considered to be the same, the micro holes 3 and 4 are preferably designed to have the same length.

Then, it is possible to make the flow rates of fluids uniform at the opening portions 3*b* and 4*b* of the micro holes 3 and 4.

On the other hand, in a case in which the diameters of the respective micro holes 3 and 4 are different, it is possible to make the flow rates of fluids uniform at the opening portions 3*b* and 4*b* by appropriately changing the lengths depending on the diameters.

In a case in which the lengths of the micro holes 3 and 4 are changed, it is possible to change the lengths of the micro holes 3 and 4 by adjusting the pitches between the other opening portions 3*b* and 4*b* which serve as outlets or by adjusting the locations of the opening portions 3*a* and 4*a* which serve as inlets.

(3c) In the fluid mixers 10 and 10*a*, the other opening portions 3*b* and 4*b* of the micro holes 3 and 4 may be disposed in the plane facing the outflow space Sa so that the pitches become random in the plane facing the outflow space Sa.

The pitches of the other opening portions 3*b* and 4*b* of the micro holes 3 and 4 which serve as outlets are disarrayed and randomly disposed.

Then, the diffusion length of a fluid differs depending on locations, and thus non-uniform (random) mixing can be realized.

As a result, random products can be obtained.

For example, in a case in which the fluid mixers 10 and 10*a* are used to manufacture nanoparticles, it is possible to stably work polydispersed particles which are not monodispersed particles having a uniform particle diameter and have a certain degree of variation in the particle diameter at a stroke.

(3d) In the fluid mixers 10 and 10*a*, the other opening portions 3*b* and 4*b* of the micro holes 3 and 4 may be disposed in the plane facing the outflow space Sa so that the pitches in a specific region in the plane differ from the pitches in the other specific region.

Figure 11:
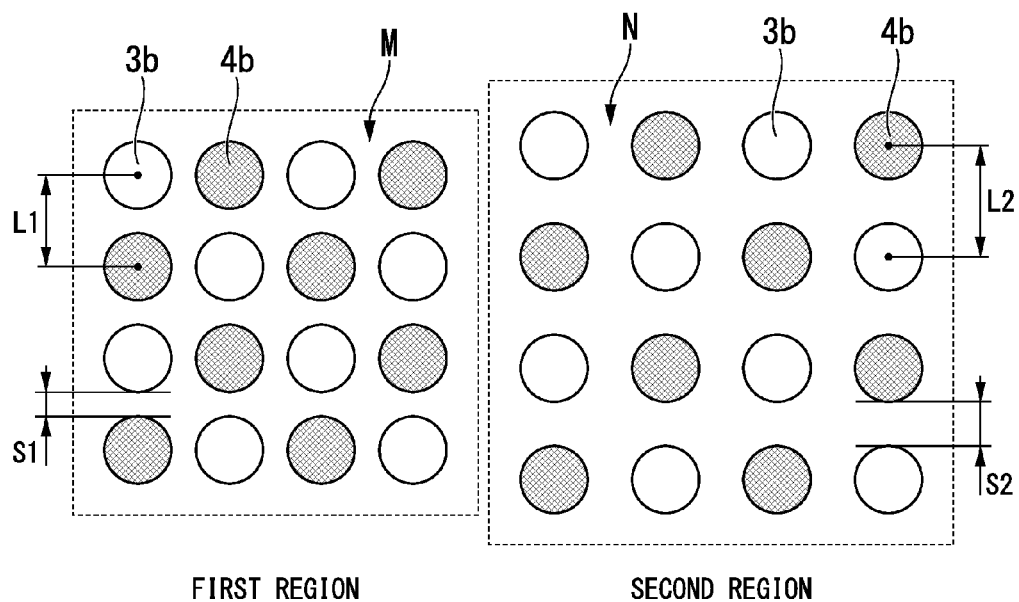
FIG. 11 is a schematic view illustrating the fluid mixer 10 or 10a according to the second embodiment, and a plan view illustrating the disposition of the opening portions of the flow channels with respect to the outflow space Sa.

For example, as illustrated in FIG. 11, the pitches of the other opening portions 3*b* and 4*b* of the micro holes 3 and 4 which serve as outlets are made to be different in a first region M and a second region N in the plane.

Then, the diffusion length of a fluid becomes different depending on regions in the plane.

For example, in a case in which the pitch L1 between the micro holes in the first region M and the pitch L2 between the micro holes in the second region N have a relationship of L1<L2, the mixing rate of fluids becomes faster in the first region M than in the second region N.

In addition, for example, in a case in which the fluid mixer is used to manufacture nanoparticles, it is possible to obtain two different kinds of products or products having various diameters by simultaneously molding particles which are not monodispersed particles having a uniform particle diameter and have two different particle diameters.

(3e) The fluid mixers 10 and 10*a* may have a structure in which the micro holes have diameters condensed in the vicinities of the other opening portions 3*b* and 4*b* of the micro holes 3 and 4 in the plane facing the outflow space Sa.

Figure 12:
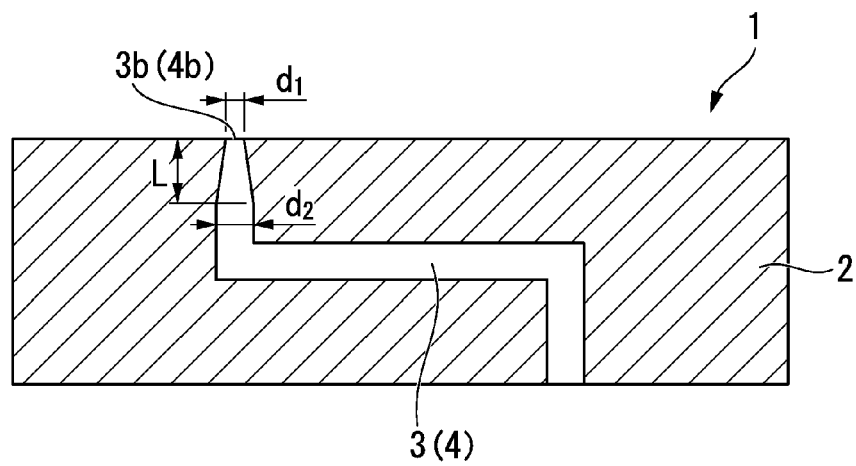
FIG. 12 is a schematic view illustrating the fluid mixer 10 or 10a according to the second embodiment, and a schematic cross-sectional view of the fluid control device 1 illustrating the shape of a micro hole.

As illustrated in FIG. 12, the diameters of the micro holes 3 and 4 are condensed at the other opening portions 3*b* and 4*b* of the micro holes 3 and 4 which serve as outlets so as to form a tapered shape.

Then, the flow rate of a fluid increases in the vicinity of the outlet, and a swirling current is likely to be caused.

Then, the mixing properties of fluids improve.

In addition, since the diameter of the flow channel is fine only in the vicinity of the outlet, it becomes possible to suppress the increase in the pressure loss to the minimum extent.

Furthermore, FIG. 12 illustrates only one hole in order to describe the shape of the micro hole.

Regarding the preferable taper angle, when the outlet diameter of the micro hole 3 or 4 is represented by $d_1$, and the inner diameter is represented by $d_2$, the ratio ($\Delta D/L$) of the condensation degree $\Delta D$ ($d_1-d_2$) in the flow channel width to the taper length L is preferably in a range of 0.05 to 4, and more preferably in a range of 0.1 to 1.

In a case in which ($\Delta D/L$) is smaller than 0.05, it becomes difficult to produce a sufficient difference in the flow channel diameter.

On the other hand, in a case in which ($\Delta D/L$) is larger than 4, retention occurs in the flow channel depending on the kind of a fluid, and sediment is likely to be generated in the flow channel.

For example, in a case in which the micro hole has an outlet diameter $d_1$ of 23 μm and an inner diameter $d_2$ of 25 μm, an increase in the flow rate of approximately 18% can be expected in the vicinity of the outlet.

Therefore, when the difference AD of the flow channel diameter is 1 μm or less, a sufficient effect can be obtained.

(3f) The fluid mixers 10 and 10*a* may have a structure in which the micro holes have diameters widened in the vicinities of the other opening portions 3*b* and 4*b* of the micro holes 3 and 4 in the plane facing the outflow space Sa.

The fluid mixers may have a structure in which the diameters of the micro holes 3 and 4 are widened in the vicinities of the other opening portions 3*b* and 4*b* of the micro holes 3 and 4 which serves as outlets.

When the above structure is provided, it is possible to suppress the separation of flows caused between two kinds of fluids flowing out of the adjacent micro holes 3 and 4.

Then, it is possible to suppress turbulent flows and the resistance of fluids flowing out of the micro holes 3 and 4 and therefore it becomes possible to pressing the fluids out with a larger pressure.

As a result, it is possible to increase the amount of a mixture being treated.

(3g) In the fluid mixers 10 and 10*a*, coating layers may be provided on the side walls of the micro holes 3 and 4.

Furthermore, when a highly viscous fluid is made to flow through the micro holes 3 and 4, there is a concern that a substance is attached to and accumulated on the side walls and holes may be clogged.

A fluororesin coating layer can be formed in a form of a thin film through coating, it is possible to form a fluororesin coating layer in the micro holes.

Therefore, when a fluororesin coating layer is provided in the base body 2, it is possible to suppress the clogging of the micro holes 3 and 4.

In addition, it is possible to improve the chemical resistance of the fluid mixer by providing a coating layer in the housing.

In order to provide the chemical resistance, it is necessary to increase the thickness of the coating layer, and a thick coating layer can be easily provided in the housing while it is difficult to provide a thick coating layer in the base body 2.

Additionally, in a case in which glass is used for the base body 2, it is possible to improve the chemical resistance.

On the other hand, since the housing is worked using a material such as SUS, generally, the housing is poor in terms of the chemical resistance.

Therefore, it is extremely effective way to provide chemical resistance in the housing.

(3h) The fluid mixers 10 and 10*a* may have temperature-adjusting device provided in the base body 2.

It is possible to provide a separate micro flow channel on the downstream side of the region A and to provide the temperature-adjusting device so as to enable the controlling of the temperature of a substance flowing in the flow channel.

The temperature-adjusting device is not particularly limited, and it is possible to form a heater or a wiring structure made up of a heater and a temperature sensor portion on the base body 2.

At this time, an insulation layer may be provided on the base body 2 in order to hold insulation with respect to a solution.

As wires for the heater or the temperature sensor, for example, nichrome, ITO or the like can be used.

In addition, microwaves may be used in order to increase the temperature.

Figure 13:
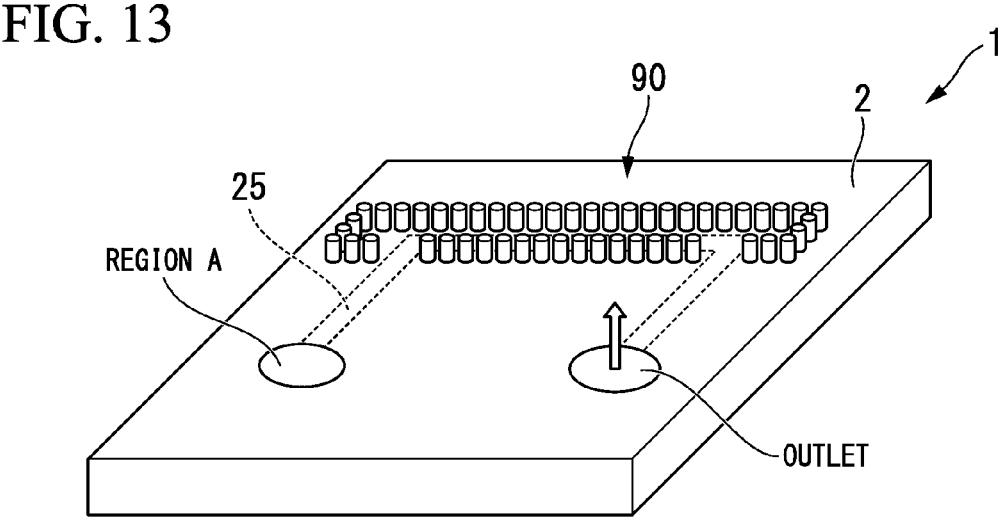
FIG. 13 is a schematic view illustrating the fluid mixer 10 or 10a according to the second embodiment, and a perspective view schematically illustrating the fluid control device 1.

For example, when a conduction pipe, a post weld wave guide (PWW) 90 or the like is provided on the base body 2 and a flow channel 25 is provided in the base body 2 as illustrated in FIG. 13, heating becomes possible.

In addition, heating or cooling may be carried out by providing a flow channel on the base body 2 and making a fluid (liquid or gas) having an appropriate temperature flow in the flow channel.

(3i) The fluid mixers 10 and 10*a* may have the temperature-adjusting device provided on the outside of the base body 2.

A temperature-adjusting mechanism may be provided on the outside of the base body 2 (for example, at the housing 20 portion).

The temperature-adjusting device is not particularly limited, and, for example, a thermocouple made up of temperature sensors or a micro heater made up of heaters can be used.

An opening for inserting the temperature-adjusting mechanism may be provided on the outside of the base body 2.

Alternatively, heating or cooling may be carried out by providing a flow channel in the base body 2 and making a fluid (liquid or gas) having an appropriate temperature flow in the flow channel.

(3j) The fluid mixers 10 and 10*a* may have a structure in which the base body 2 include an outlet flow channel 21 having an end communicated with the outlet space Sa and the other end communicated with the surface, and the outlet flow channel 21 has a diameter condensed so that the outlet flow channel becomes wide at one end and narrow at the other end.

Figure 14:
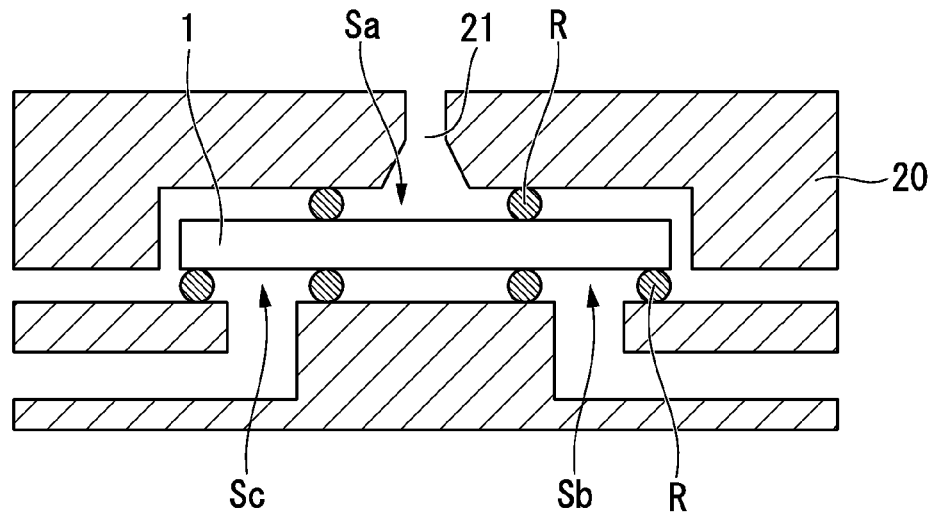
FIG. 14 is a schematic cross-sectional view illustrating the fluid mixer 10 or 10a according to the second embodiment.

The fluid mixers 10 and 10*a* may have a structure in which the outlet flow channel 21 provided in the housing 20 has an end communicated with the outlet space Sa and the other end communicated with the surface, and is condensed at the other end as illustrated in FIG. 14.

In the region A, since the micro holes 3 and 4 are two-dimensionally arrayed, the opening area in the base body 2 in the region A needs to be a larger area than the area of the region in which the flow channel groups are present.

Additionally, in order to rapidly mix two kinds of fluids flowing out of the micro holes 3 and 4 the diameter of the outlet flow channel is preferably set to be small, and the diffusion distance between the fluids is preferably set to be small.

Therefore, a structure in which the outlet flow channel is condensed in the area A is preferable.

(3k) The fluid mixers 10 and 10a may have a structure in which the base body 2 includes the outlet flow channel 21 which has an end communicated with the outlet space Sa and the other end communicated with the surface, and the outlet flow channel 21 is bent.

Figure 15:
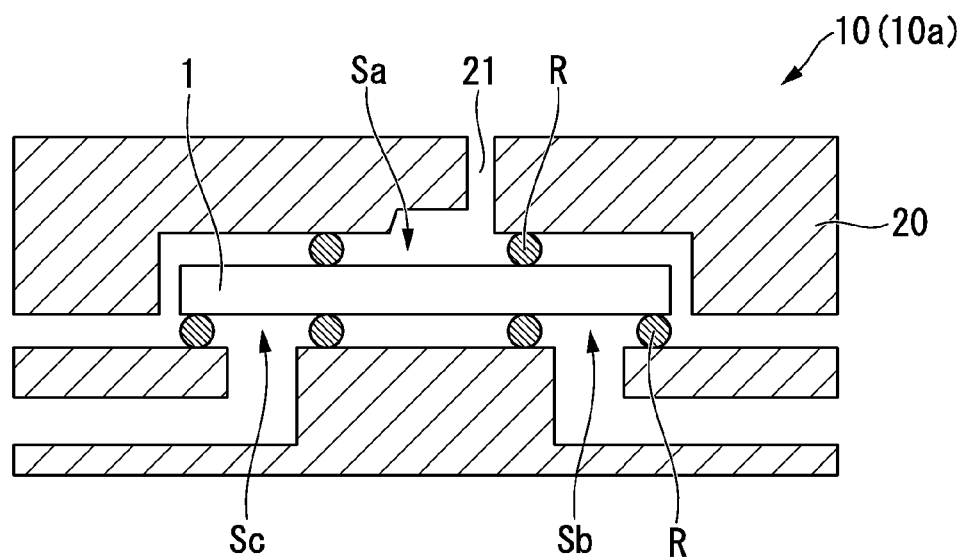
FIG. 15 is a schematic cross-sectional view illustrating the fluid mixer 10 or 10a according to the second embodiment.

As illustrated in FIG. 15, in the outlet flow channel 21 which is provided in the housing 20 and has an end communicated with the outlet space Sa and the other end communicated with the surface, the outlet flow channel 21 may have a structure in which one side is bent.

When the outlet flow channel is bent, convection is forcibly caused in the bent portion.

Furthermore, the convection causes the deformation of fluids, and it is possible to shorten the diffusion distance between two kinds of fluids.

Then, more efficient mixing can be realized.

Third Embodiment

Figure 16A:
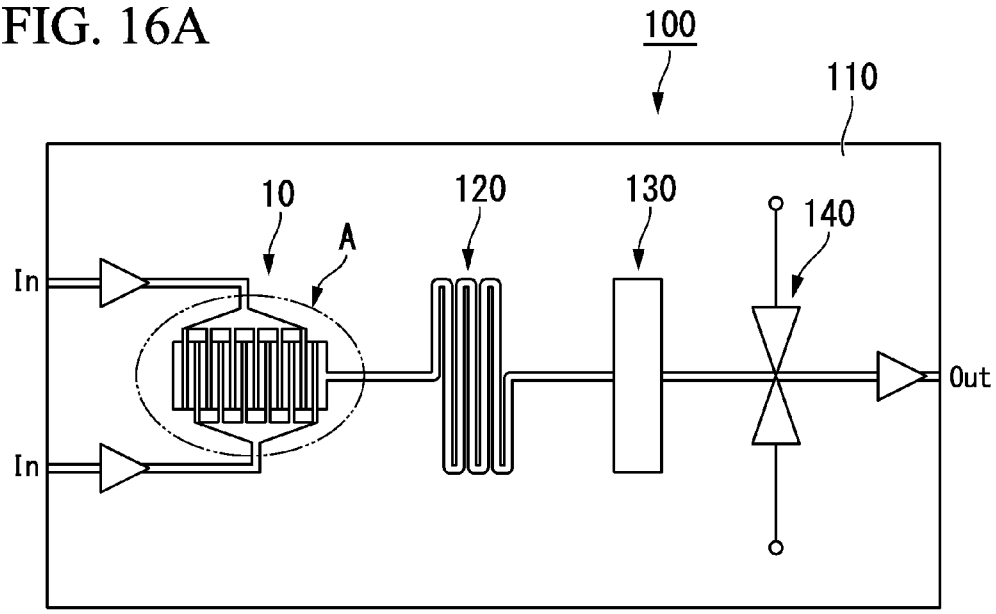
FIG. 16A is a schematic view illustrating a configuration example of a μTAS chip 100 on which the fluid mixer 10 or 10a is mounted, and a planar cross-sectional view of the μTAS chip 100.

FIG. 16A is a schematic view illustrating a configuration example of a OAS chip 100 on which the fluid control device 1, 1a, 1b, 1c, or 1d described above is mounted, and a plan view of the μTAS chip 100.

Figure 16B:
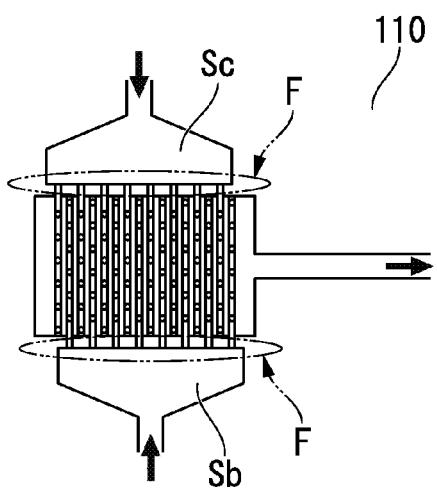
FIG. 16B is an enlarged plan view of a portion (A portion) of the fluid mixer in the μTAS chip of FIG. 16A.
Figure 16C:
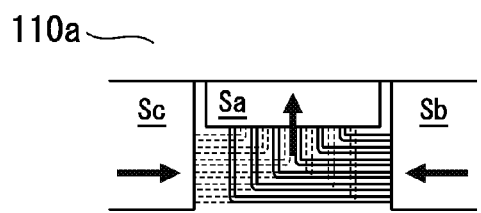
FIG. 16C is an enlarged cross-sectional view of the portion (A portion) of the fluid mixer in the μTAS chip of FIG. 16A.

FIG. 16B is an enlarged plan view of the portion of the fluid control device, and FIG. 16C is an enlarged cross-sectional view of the portion of the fluid control device. The μTAS chip 100 illustrated in FIGS. 16A to 16C includes at least a base body 110 that functions as μTAS chip main body and a fluid control device 10 (10a) provided so as to form an integrated body with the base body 110.

The μTAS chip 100 further includes a reactor 120, a separator 130 and a detector 140 on the downstream side of the fluid control device 10 (10a), but this illustrates a configuration example of the μTAS chip, and the μTAS chip is not limited thereto.

For example, the reactor 120, the separator 130 and the detector 140 may be configured to form a separate body from the μTAS chip 100.

A fluid (liquid or gas) which is an analysis subject and a selected carrier are made to pass the filter function portions F from the inflow spaces Sb and Sc, then, made to flow in the fluid control device 10 (10a), and mixed in the outflow space Sa.

After that, a sample that has been reacted in the reactor 120 is separated from the carrier using the separator 130 as necessary, and desired analysis information is sent to an external devices and the like using the detector 140.

Furthermore, in addition to the configuration of the embodiment in which a fluid mixer, the reactor, the separator and the like are integrated on a base body, the μTAS can employ a configuration in which individual components such as the fluid mixer, the reactor and the separator are assembled and systemized.

Thus far, the embodiment of the invention has been described using specific examples, but the technical scope of the invention is not limited to the embodiment, and a variety of modifications can be added within the scope of the purpose of the invention.

What is claimed is:

1. A fluid control device for mixing liquids, comprising:
a monolithic base body;
first micro holes, which are disposed in the base body, belonging to a flow channel group α that configures a specific group and having opening portions in a region A and a region B on surfaces being outer surfaces of the base body; and
second micro holes, which are disposed in the base body, belonging to in a flow channel group β (n) that configures an other specific group and having opening portions in the region A and a region C (n) on the surfaces being outer surfaces of the base body, wherein
in the base body, the first micro holes are disposed apart from the second micro holes throughout entire lengths,
the first micro holes are three-dimensionally intersected to each other or bent between the region A and the region B,
the second micro holes are three-dimensionally intersected to each other or bent between the region A and the region C,
the opening portions in the region A are outlets of the liquids, and the region A is positioned on an upper surface of the monolithic base body, and
the n refers to a natural number.

2. The fluid control device according to claim 1, wherein in the region A, the opening portions of all the first and second micro holes are two-dimensionally disposed.

3. The fluid control device according to claim 2, wherein in the region A, the opening portions of the first micro holes and the opening portions of the second micro holes are alternately formed so as to be most adjacent to each other.

4. A fluid mixer comprising:
the fluid control device according to claim 1; and
a housing that accommodates the fluid control device and includes at least a monolithic outflow space facing the region A of the fluid control device and inflow spaces separately facing the region B and the region C of the fluid control device.

5. A fluid mixer comprising:
the fluid control device according to claim 2; and
a housing that accommodates the fluid control device and includes at least a monolithic outflow space facing the region A of the fluid control device and inflow spaces separately facing the region B and the region C of the fluid control device.

6. A fluid mixer comprising:
the fluid control device according to claim 3; and
a housing that accommodates the fluid control device and includes at least a monolithic outflow space facing the region A of the fluid control device and inflow spaces separately facing the region B and the region C of the fluid control device.

7. A fluid mixer comprising:
a monolithic base body having: a plurality of micro holes that function as flow channels and configure a first group and a second group; a plurality of inflow spaces; and a common outflow space, wherein
all the micro holes that configure the first group have one opening portion communicated with specific one of the inflow spaces and an other opening portion communicated with the outflow space, and are three-dimensionally intersected to each other or bent in the monolithic base body, all the micro holes that configure the second group have an opening portion communicated with the other specific inflow space and the other opening portion communicated with the outflow space, and the common outflow space is positioned on an upper surface of the monolithic base body.

8. The fluid mixer according to claim 7, wherein
the other opening portions of all the micro holes that configure the first group and the other opening portions of all the micro holes that configure the second group are two-dimensionally disposed in a plane facing the outflow space.

9. The fluid mixer according to claim 8, wherein
in the plane facing the outflow space, the other opening portions of the micro holes are disposed at locations most adjacent to the other opening portions having the opening portion communicated with the different inflow space.

10. The fluid mixer according to claim 7, wherein
the plurality of the micro holes have substantially the same length.

11. The fluid mixer according to claim 8, wherein
the plurality of the micro holes have substantially the same length.

12. The fluid mixer according to claim 9, wherein
the plurality of the micro holes have substantially the same length.

13. The fluid mixer according to claim 1, wherein
in the monolithic base body, the first micro holes have a first portion which is in parallel to the upper surfaces of the monolithic base body and a second portion which is vertical to the upper surfaces of the monolithic base body, the first portion and second portion being intersected to each other, and in the monolithic base body, the second micro holes have a third portion which is in parallel to the upper surfaces of the monolithic base body and a fourth portion which is vertical to the upper surfaces of the monolithic base body, the third portion and fourth portion being intersected to each other.

14. The fluid mixer according to claim 1, wherein
the opening portions in the regions B and C are inlets of the liquids, and the regions B and C are positioned on a down surface of the monolithic base body.

* * * * *